United States Patent
Kumar et al.

(10) Patent No.: US 9,779,094 B2
(45) Date of Patent: *Oct. 3, 2017

(54) SYSTEMS AND METHODS FOR TAGGING EMAILS BY DISCUSSIONS

(75) Inventors: Mohan Kumar, San Jose, CA (US); Gary Lehrman, Cupertino, CA (US); Hari Krishna Dara, Mountain View, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,398

(22) Filed: Feb. 27, 2012

(65) Prior Publication Data

US 2012/0158728 A1   Jun. 21, 2012

Related U.S. Application Data

(63) Continuation of application No. 12/181,992, filed on Jul. 29, 2008, now Pat. No. 9,092,434.

(51) Int. Cl.
*G06F 7/00* (2006.01)
*G06F 17/30* (2006.01)

(52) U.S. Cl.
CPC .. *G06F 17/30038* (2013.01); *G06F 17/30873* (2013.01)

(58) Field of Classification Search
CPC ......... G06F 17/30554; G06F 17/30002; G06F 17/30011; G06F 17/30241; G06F 17/30557

(Continued)

(56) References Cited

U.S. PATENT DOCUMENTS 6,279,013 B1 * 8/2001 LaMarca ............... G06Q 30/02
                                                                       379/100.07
6,560,620 B1    5/2003 Ching
(Continued)

OTHER PUBLICATIONS

Kerr, Bernard; Thread Arcs: An email Thread Visualization, Collaborative User Experience Group IBM Research, 2003.
(Continued)

*Primary Examiner* — Daniel Kuddus
(74) *Attorney, Agent, or Firm* — Wilmer Cutler Pickering Hale and Dorr LLP

(57) ABSTRACT

The invention provides for techniques to process and produce email documents. The techniques provide for organizing a first plurality of email documents into a plurality of document groups, reviewing a document group from the plurality of document groups, and associating a review content with the document group. The techniques provide for ways to propagate the review content to one or more email documents associated with the document group and producing a second plurality of email documents. The techniques provide for annotating one or more email documents in accordance with the review content. Depending on the embodiment, review content may include text, graphics, audio, tag, and multimedia information. Produced documents can be searched and browsed in accordance with information in the review content. Email documents can be grouped by information in meta information and/or header information associated with the email documents into various groups, including threads or conversations, for example.

19 Claims, 25 Drawing Sheets

(58) Field of Classification Search
USPC .................................. 707/728, 730, 999.102
See application file for complete search history.

(56) References Cited

U.S. PATENT DOCUMENTS

| | | | |
|---|---|---|---|
| 6,582,474 B2 | 6/2003 | LaMarca et al. | |
| 6,665,656 B1* | 12/2003 | Carter | 707/748 |
| 6,929,570 B2* | 8/2005 | Forman, III | A63B 69/0095 |
| | | | 473/459 |
| 7,007,067 B1 | 2/2006 | Azvine et al. | |
| 7,130,858 B2* | 10/2006 | Ciaramitaro et al. | |
| 7,194,681 B1 | 3/2007 | Horvitz | |
| 7,225,234 B2* | 5/2007 | Naqvi | G06F 17/30864 |
| | | | 705/14.54 |
| 7,260,773 B2 | 8/2007 | Zernik | |
| 7,272,610 B2* | 9/2007 | Torres | |
| 7,386,439 B1* | 6/2008 | Charnock | G06F 17/30699 |
| | | | 704/9 |
| 7,421,690 B2 | 9/2008 | Forstall et al. | |
| 7,536,635 B2* | 5/2009 | Racovolis et al. | 715/229 |
| 7,546,346 B2 | 6/2009 | Ouchi | |
| 7,593,995 B1* | 9/2009 | He | G06Q 10/107 |
| | | | 707/999.003 |
| 7,596,606 B2* | 9/2009 | Codignotto | 709/206 |
| 7,644,366 B1* | 1/2010 | McKinney | 715/738 |
| 7,685,247 B2 | 3/2010 | Codignotto | |
| 7,689,658 B2 | 3/2010 | Codignotto | |
| 7,693,866 B1* | 4/2010 | Weaver | G06F 17/30011 |
| | | | 707/999.107 |
| 7,698,372 B2 | 4/2010 | Codignotto | |
| 7,702,736 B2 | 4/2010 | Ouchi | |
| 7,702,737 B2 | 4/2010 | Ouchi | |
| 7,730,113 B1* | 6/2010 | Payette | G06Q 10/00 |
| | | | 707/821 |
| 7,757,162 B2 | 7/2010 | Barrus et al. | |
| 7,805,673 B2* | 9/2010 | der Quaeler et al. | 715/255 |
| 7,813,915 B2 | 10/2010 | Nakao | |
| 7,836,041 B1* | 11/2010 | Jain | G06F 17/30864 |
| | | | 707/706 |
| 7,836,439 B2* | 11/2010 | Shenfield | G06F 9/44521 |
| | | | 717/143 |
| 7,865,815 B2 | 1/2011 | Albornoz et al. | |
| 7,885,955 B2 | 2/2011 | Hull et al. | |
| 7,908,280 B2* | 3/2011 | Frank | G06F 17/30241 |
| | | | 707/749 |
| 7,917,464 B2* | 3/2011 | Frank | G06F 17/30241 |
| | | | 707/602 |
| 7,949,938 B2 | 5/2011 | Champion et al. | |
| 7,958,127 B2* | 6/2011 | Edmonds | G06Q 30/02 |
| | | | 707/748 |
| 8,171,393 B2 | 5/2012 | Rangan | |
| 8,229,734 B2* | 7/2012 | Bennett | G06F 17/27 |
| | | | 704/9 |
| 2002/0078158 A1 | 6/2002 | Brown et al. | |
| 2002/0143890 A1* | 10/2002 | Naqvi | G06F 17/30864 |
| | | | 709/217 |
| 2003/0023435 A1 | 1/2003 | Josephson | |
| 2003/0023675 A1 | 1/2003 | Ouchi | |
| 2003/0028580 A1 | 2/2003 | Kucherawy | |
| 2003/0051214 A1 | 3/2003 | Graham et al. | |
| 2003/0195937 A1 | 10/2003 | Kircher et al. | |
| 2003/0220912 A1* | 11/2003 | Fain et al. | 707/3 |
| 2003/0227487 A1* | 12/2003 | Hugh | 345/777 |
| 2004/0002988 A1* | 1/2004 | Seshadri | G06F 17/30516 |
| 2004/0088328 A1 | 5/2004 | Cook et al. | |
| 2004/0088332 A1 | 5/2004 | Lee et al. | |
| 2004/0194025 A1* | 9/2004 | Hubert et al. | 715/513 |
| 2004/0221295 A1 | 11/2004 | Kawai et al. | |
| 2004/0261016 A1 | 12/2004 | Glass et al. | |
| 2005/0055359 A1 | 3/2005 | Kawai et al. | |
| 2005/0097321 A1 | 5/2005 | Zhu et al. | |
| 2005/0223061 A1 | 10/2005 | Aurbach et al. | |
| 2006/0031373 A1 | 2/2006 | Werner et al. | |
| 2006/0036588 A1* | 2/2006 | Frank | G06F 17/30241 |
| 2006/0083357 A1 | 4/2006 | Howell et al. | |
| 2006/0083358 A1* | 4/2006 | Fong et al. | 379/88.13 |
| 2006/0095473 A1* | 5/2006 | Fox | 707/104.1 |
| 2006/0143307 A1 | 6/2006 | Codignotto | |
| 2006/0195914 A1* | 8/2006 | Schwartz et al. | 726/32 |
| 2006/0242243 A1 | 10/2006 | Matsumoto | |
| 2006/0271526 A1* | 11/2006 | Charnock | G06Q 30/02 |
| 2006/0288285 A1* | 12/2006 | Lai et al. | 715/708 |
| 2006/0294134 A1* | 12/2006 | Berkhim | G06F 17/30616 |
| 2007/0038437 A1* | 2/2007 | Brun | 704/9 |
| 2007/0083598 A1 | 4/2007 | Kwakami et al. | |
| 2007/0106729 A1 | 5/2007 | Adams et al. | |
| 2007/0112777 A1* | 5/2007 | Field | G06F 17/3087 |
| 2007/0150802 A1* | 6/2007 | Wan | G06F 17/241 |
| | | | 715/205 |
| 2007/0157287 A1 | 7/2007 | Lim | |
| 2007/0271235 A1* | 11/2007 | Frank | G06F 17/30241 |
| 2007/0299828 A1* | 12/2007 | Lewis | G06F 17/30569 |
| 2008/0005064 A1* | 1/2008 | Sarukkai | 707/3 |
| 2008/0027969 A1* | 1/2008 | Wen | G06F 17/3089 |
| 2008/0059539 A1* | 3/2008 | Chin | G06Q 10/10 |
| 2008/0115076 A1* | 5/2008 | Frank | G06F 17/30241 |
| | | | 715/771 |
| 2008/0126300 A1* | 5/2008 | Boss et al. | 707/3 |
| 2009/0024668 A1 | 1/2009 | Bildhaeuser et al. | |
| 2009/0024942 A1* | 1/2009 | Pendergast | G06F 3/1204 |
| | | | 715/764 |
| 2009/0031401 A1* | 1/2009 | Cudich et al. | 726/4 |
| 2009/0089244 A1* | 4/2009 | Donato | G06Q 10/10 |
| 2009/0265609 A1* | 10/2009 | Rangan | G06F 17/30011 |
| | | | 715/234 |
| 2009/0265809 A1* | 10/2009 | Chen | C12N 15/8286 |
| | | | 800/279 |
| 2010/0030798 A1* | 2/2010 | Kumar et al. | 707/102 |
| 2012/0158728 A1 | 6/2012 | Kumar | |

OTHER PUBLICATIONS

Samiei, Maryam; EXMail: Using Information Visualizatoin Techniques to Help Manage Email, School of Engineering Science Simon Fraser University, 2004.

Wan, Stephen; Generating Overview Summeries of Ongoing Email Discussions, Department of Computing Macquarine University, 2004.

Wu, Yejun; Indexing emails and email threads for retrieval, College on Information Studies and UMIACS University of Maryland, 2005.

Office Action for U.S. Appl. No. 12/181,992, mailed Nov. 19, 2010.
Office Action for U.S. Appl. No. 12/181,992, mailed Apr. 12, 2011.
Office Action for U.S. Appl. No. 12/181,992, mailed Dec. 8, 2011.
Office Action for U.S. Appl. No. 12/104,297, mailed May 26, 2011.
Notice of Allowance for U.S. Appl. No. 12/401,297, mailed Dec. 2, 2011.
Office Action for U.S. Appl. No. 12/181,992, mailed May 8, 2012.
Office Action for U.S. Appl. No. 12/181,992, mailed Sep. 27, 2013.
Office Action for U.S. Appl. No. 12/181,992, mailed Nov. 19, 2014.
Office Action for U.S. Appl. No. 12/181,992, mailed Apr. 7, 2014.

* cited by examiner

De-duplication Stage

Review Stage

Searched: 51,679  Found: 4,213  565  96  3,477

Tag

Add to project: Energy-Project — 9220

9230
- Reviewed: Tag
- Unreviewed: Un-Tag
- Hot: Keep as-is
- Privileged: Keep as-is
- Responsive: Keep as-is Note [Comment on tag event] — 9240

9260 — tagging all emails for all the discussion threads.

Send email summary to: superuser

Apply tag to:
○ Only selected discussions
◉ All discussions found

[Submit] [Close]

9270

9250

565 Discussions found | Show 10 | ‹Prev | 1 - 10 | Next›

| ☑ | Title | Originator | Messages | Sent | Score ▼ |
|---|---|---|---|---|---|
| ☑ | Missing Paychecks | UBSW Energy General Announcements | 2 | 03/04/2002 (2032 days ago) | |
| ☑ | lists | Patrick Mulvany | 2 | 02/01/2002 (2063 days ago) | |
| ☑ | Employee Transfer | Ina Rangel | 4 | 03/07/2002 (2029 days ago) | |
| ☑ | Access to TAGG | Phillip Love | 6 | 03/07/2002 (2029 days ago) | |
| ☑ | Access to TAGG | Phillip Love | 6 | 03/07/2002 (2029 days ago) | |
| ☑ | Energy Forum | paul joskow | 3 | 07/13/2001 (2266 days ago) | |
| ☑ | Energy Analysis | Ricardo Charvel | 4 | 12/06/2000 (2485 days ago) | |
| ☑ | Energy Analysis | Nike Papadopoulos" | 2 | 12/04/2000 (2487 days ago) | |
| ☑ | Important Energy Policy Conference, Sept 27 | colleen benefield | 2 | 09/14/2001 (2203 days ago) | |
| ☑ | Steve Peace On Energy Supply | tony valenzuela | 2 | 07/17/2000 (2627 days ago) | |

Fig. 9C

Propagation of Review Content

Propagation Stage

SYSTEMS AND METHODS FOR TAGGING EMAILS BY DISCUSSIONS

CROSS-REFERENCES TO RELATED APPLICATIONS

This present patent application is a Continuation of U.S. patent application Ser. No. 12/181,992, filed Jul. 29, 2008 and entitled "Systems and Methods for Tagging Emails by Discussions," which is related to U.S. patent application Ser. No. 11/657,398, filed Jan. 23, 2007 and entitled "Methods and Systems of Electronic Message Threading and Ranking." The entire disclosures of U.S. patent application Ser. No. 12/181,992 and U.S. patent application Ser. No. 11/657,398 are incorporated herein by reference for all purposes.

BACKGROUND OF THE INVENTION

Embodiments of the present invention generally relate to techniques for processing electronic messages. More particularly, the present invention relates to techniques for reviewing, categorizing and tagging email documents.

Collaboration using electronic messaging, such as email and instant messaging, is becoming increasingly ubiquitous. Many users and organizations have transitioned to "paperless" offices, where information and documents are communicated almost exclusively using electronic messaging. Users and organizations have expended time and money to manage, sort and archive increasing volumes of digital documents and data.

Management of electronic resources has however become a more and more expensive process. Part of the reason is that many regulatory agencies—such as the Federal Energy Regulatory Commission (FERC), the Securities and Exchange Commission (SEC), and the Food and Drug Administration (FDA) in the U.S.—have become increasingly aggressive in enforcing regulations requiring storage, analysis, and reporting of information based on electronic messages.

Another reason is due to the increasing ubiquitous use of electronic discovery (e-discovery) in the litigation context. E-discovery refers to a process in which electronic resources are sought, located, secured, and searched with the intent of using it as evidence in litigation. The nature of modern digital data makes digital documents extremely well-suited to investigation. Compared to paper-based documents, digital data can be searched with relative ease. Digital data is relatively difficult to destroy since electronic documents are typically scattered and stored throughout a network during their normal usage. Standard discoverable electronic data include texts, images, calendar and schedule data, audio files, spreadsheets, animation files, databases, web site archives, even computer programs such as viruses and the signatures they may leave behind.

Since even a small company in the modern world can be subjected to a constant stream of potential and actual litigations, all companies must have an effective policy and infrastructure to carry out duties on the one hand to preserve documents that may be relevant to the stream of potential and actual litigations and on the other to protect documents that may be privileged to the company and documents that contain valuable industrial secret that should justifiably be kept from competitors.

Due to the important role emails play in a modern corporate setting, emails are becoming a key target of e-discovery requests. One problem with processing email documents is that the very same characteristics that make email documents robust and durable—the extent by which electronic documents are routinely duplicated and distributed—also make email documents difficult to review and manage. Just sorting through the redundant information alone can be costly. The competing goals of making sure an investigation is exhaustive and protecting irrelevant and confidential information from adversaries and competitors can make e-discovery a very delicate task.

In a typical discovery process, many companies already allocate teams of employees spending days and weeks reviewing emails in order to respond to regulatory audits and investigations. As emails become increasingly the standard mode of corporate communications, the pressure to produce emails with multi-megabyte attachments stored in various diverse and propriety formats in various high-stakes litigations will only intensify.

For these reasons, there is a continual need for tools that can help organizations better manage and lower the costs of reviewing email documents in an e-discovery and litigations context.

BRIEF SUMMARY OF THE INVENTION

Embodiments of the present invention generally relate to techniques for processing electronic messages. More particularly, the present invention relates to techniques for reviewing, categorizing and tagging email documents.

According to an embodiment, the techniques for processing and producing email documents provide for organizing a first plurality of email documents into a plurality of document groups, reviewing a document group from the plurality of document groups, and associating a review content with the document group. Review content is then propagated to one or more email documents associated with the document group. A second plurality of email documents that is considered relevant to a document request, the second plurality of email documents included in the first plurality of email documents, is then produced.

According to an embodiment, the techniques provide for annotating one or more email documents in accordance with the review content. Depending on the embodiments, the review content can include text information, image information, graphics information, audio information, multimedia information, tag information, and redaction information. Depending on the embodiments, the produced documents can be made to be searched and browsed in accordance with the review content. One or more portions of each of produced documents may also be redacted in accordance with the redacting information.

According to an embodiment, the techniques provide for organizing the first plurality of email documents in accordance with meta information and/or header information associated with the first plurality of email documents. The first plurality of email documents can be organized in accordance with date information, sender information, receiver information, among others, associated with the first plurality of email documents. The first plurality of email documents can be organized into a plurality of email threads.

According to an embodiment, the techniques provide for annotating a multiply annotated email document, wherein the multiply annotated email document is associated with a plurality of review contents. The plurality of review contents are aggregated, and the multiply annotated email document is annotated in accordance with the aggregation of the plurality of review contents.

The foregoing, together with other features, embodiments, and advantages of the present invention, will become

BRIEF DESCRIPTION OF THE DRAWINGS

FIG. 9A is a simplified illustration of a graphical user interface (GUI) for creating a predefined tag for labeling one or more email documents according to an embodiment;

FIG. 9C is a simplified illustration of a GUI for reviewing and tagging a discussion thread;

DETAILED DESCRIPTION OF THE INVENTION

Figure 1:
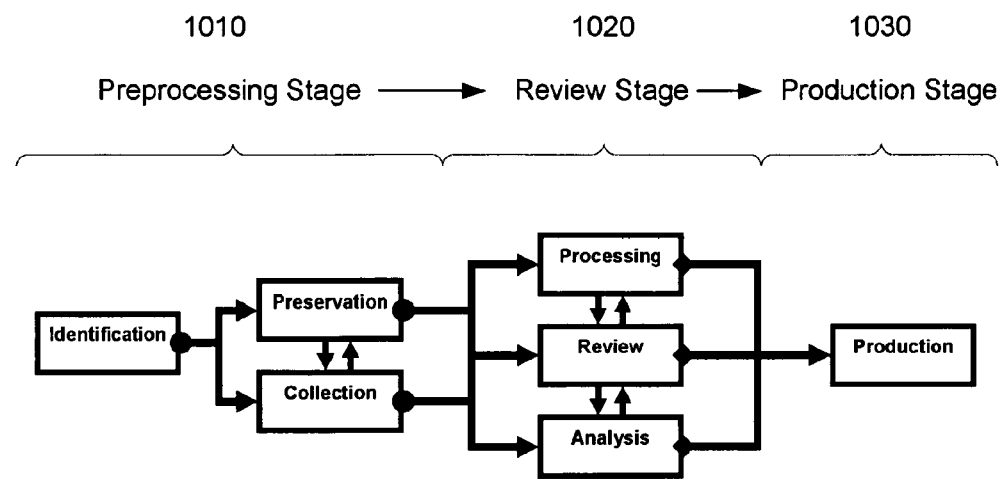
FIG. 1 is a simplified illustration of a general electronic discovery process workflow according to an embodiment.

Embodiments of the present invention generally relate to techniques for processing electronic messages. More particularly, the present invention relates to techniques for reviewing, categorizing and tagging email documents.

According to an embodiment, the invention provides for techniques for an attorney or legal investigator to use an electronic system to select, review, and produce a set of email documents in an electronic discovery for litigation purposes. Electronic discovery often requires analyzing electronically stored information (ESI) belonging to several email users. Depending on the situation, some of these users can be found in one organization and some can be found in different organizations. In discovery, each of these documents needs to be reviewed to create eventually a set of responsive documents that are produced in response to a discovery request by an opposing party or a court. While a goal is to produce documents that are responsive to discovery requests, it is also a goal to protect documents that are not relevant to the controversies or otherwise not privileged from an opposing party.

Reviewing electronic information in response to litigation, especially document sets such as emails, is an expensive proposition. The costs associated with the process can be high due not just to the tremendous volume of information but also due to the redundancy, duplicity and scattering of the information. Often, many independent reviewers must be hired to organize and review content that has been duplicated and scattered many times. Additional costs will be incurred in the process to reconcile the reviewed documents generated by the independent reviewers.

A set of email documents being discovered is typically initially organized by the original possessors (custodians). There is a lot of duplicity of documents spread amongst custodians. For example, when one sends out an email of attachments, the attachments can be replicated many times for each subsequent reply or forwarding of email. It is not unusual for an email conversation to contain email documents that have been forwarded, modified, replied, and counter-replied.

A set of email documents being discovered is also typically initially distributed and scattered in many places. It is not unusual, for example, to have email messages of a thread of conversation be saved on various email servers, databases, corporate repositories, backup disks, individual computers including desktop computers, laptop computers, and PDA devices, and even knowledge bases. Email documents can also be saved in many different formats—including but not limited to Exchange, Outlook mail, OS X mail, html, text, rich text, and pdf. The number of formats expand when one takes into account the types of documents that can be stored as email attachments.

An embodiment of the invention includes techniques to reduce review costs by allowing reviewers to organize better loosely organized and scatter documents and to review a more targeted set of the documents. According to an embodiment, the technique includes allowing a set of email documents to be organized, reviewed, tagged, and produced. The technique includes organizing a set of documents by various criteria. In one embodiment, the documents are grouped by information in the email headers and/or other meta information associated with the email documents.

Email documents can be grouped by date, sender, receiver, subject heading, for example. Email documents can be grouped into threads of conversations based on information in the email headers. Keywords in the body and/or attachments of emails can also be used for identifying, grouping, and organizing email documents.

An embodiment of the invention includes organizing and viewing a set of organized email documents in various manners. For example, when email documents are organized and viewed in the context of a thread or conversation, a reviewer can view the email documents in the thread or conversation and then add review contents to either the thread or group—or the individual email documents. Depending on whether specific documents or whether groupings (e.g. threads conversations or folders) are selected, the technique includes propagating the review content to a set of related documents.

In one embodiment, the technique includes marking one or more documents, creating a review content, and propagating the review content to a set of related documents. According to an embodiment, the review content can include annotations, tags, and/or redactions. In an embodiment, annotation information is information created by reviewers anew to be associated with the documents. For example, a reviewer may add comments such as "this is interesting" or a graphic signature to a set of documents. In general, annotations information can include data in variety of formats, including basic text, rich text, graphics, audio, and video.

According to an embodiment, tag information include predefined information that can be associated with the documents. The information can be created before the documents are reviewed or while the documents are being reviewed. In an example, a tag is a text string such as "reviewed," "unreviewed," "hot," "privileged," or "responsive." These tags are used to categorize documents into predefined groups and provide a standardized way for reviewers to mark and categorize email documents. Like annotations, tags can also come in a variety of formats, including basic text, rich text, graphics, audio, and video.

In an embodiment, redaction information include instructions that specify portions of email documents to be redacted or hidden in the production documents. Redaction is important where a document may include portions that are relevant to a request for discovery as well as portions that are not. For example, an email document may include portions that are responsive to a discovery request and portions that are legally privileged. Alternatively, an email document may include portions that are responsive to a discovery request and portions that contain bona-fide industrial secrets that are not relevant to the discovery request. In these cases, to protect the interests of both the discoverer and discoveree, email documents with both responsive as well as confidential portions should be produced with portions of the documents redacted. In the embodiment, redaction information will specify, among other information, location within documents that should be reacted or hidden (e.g. lines 5-63 to be deleted) and how the redaction should be carried out (e.g. lines specified above to be blotted out by black ink).

According to an embodiment, produced email documents can also be organized by any of various information specified in the review content. For example, all documents tagged as relevant to the deal negotiations of Oct. 15, 2007 can be grouped together. The produced electronic documents can also be enabled to be searched by the tags. For example, a search for the produced documents related to deal negotiations of Oct. 15, 2007 will return a set of documents tagged as relevant to the deal negotiations of Oct. 15, 2007.

As another example, all documents having been reviewed and deemed "responsive" to a discovery request can be tagged with a "responsive" tag. Produced document can present a folder described as "responsive." A reviewer may browse the "responsive" folder which include all documents tagged with the "responsive" tag. A reviewer can also subsequently search for "responsive" documents, which will then return the list of documents previously tagged with the "responsive" tag.

According to an embodiment, embodiments of the invention allows an email forensics examiner—or reviewer—to mark a set of discussion-related documents (e.g. threads, conversations, and other groupings of email documents) quickly for subsequent detailed examination or other activity. Application of embodiments can render the review process to become very efficient, much less time-consuming and much less error-prone.

In the following description, for the purposes of explanation, specific details of embodiments are set forth in order to provide further understanding of the invention. However, it will be apparent that the invention may be practiced without necessarily these specific details.

According to an embodiment, without applying embodiments of the current invention, reviewers may find it difficult to obtain a right search term, increasing the chance that reviewers will miss relevant email documents. Without applying embodiments of the current invention, reviewers may find it very tedious, error-prone and time-consuming to review documents.

According to an embodiment, without applying embodiments of the current invention, inventors would have to manually write down the different message ids associated with each email document in each email thread and grouping. The reviewer would have to manually find each message in search view, mark each such message, and tag them. This can be very tedious, error-prone and time-consuming.

FIG. 1 is a simplified illustration of a general electronic discovery process workflow. The workflow depicts an embodiment of an electronic discovery reference model that includes a pre-processing stage 1010, a review stage 1020, and a production stage 1030.

Within pre-processing stage 1010, the scope, breadth and depth of electronically stored documents are determined Sources of electronic documents such as custodians—defined as persons or entities that own or control access to a set of electronic documents within an enterprise—are identified. (from a technological perspective, custodians can defined to be any person who has Read and Write access to electronically stored information (ESI) during the course of normal operational activity.) A large pool of potentially discoverable electronically stored information is identified.

Depending on the specific situations, the scope of discoverable information may be influenced by the claims and defenses asserted, preservation demands filed, and specific documents requested for in the disclosure and discovery demands.

In general, during pending litigation, an enterprise may be obliged to identify all custodians and source locations where ESI are likely present. In enterprise environments, this can refer to, for example, shared email stores (such as central email servers), personal email stores (such as Microsoft Outlook PST files), network file shares, shared portals (such as Microsoft SharePoint) and local files and data in desktop and laptop hard drives of computer devices.

As depicted in FIG. 1, in addition to a step for identifying the documents to be collected, pre-processing stage 1010 can also include a step for collecting ESI and a step for preserving ESI. The collection step includes collecting data previously identified. To maintain and prove integrity, data can be collected and preserved in the original native form and subsequently preserved within an eye toward content integrity. Depending on the specific embodiments, both content data as well as meta-data for the contents, such as the owner, last access time, last modified time and external name of the content data, can all be collected and preserved.

Part of the responsibilities in responding to a discovery request is a duty to preserve electronic data that exist implicitly or that can be explicitly stated by a legal order to preserve data pending a trial. A blanket preservation order can be extremely disruptive for normal operation of a business, however. On the one hand, businesses face the risk of data spoliation and sanctions that can result if it did deemed not to have carried out its responsibilities. On the other hand, businesses must also manage the risks of spoliation and sanctions against the real costs of interruptions that preservation demand on businesses.

In the pre-processing stage, attorneys and legal teams are often deeply involved in preparing relevant files for review. An efficient process is necessary because these processes need to be performed in a manner that is consistent with to clients' legal obligations but that is also appropriately cost-effective and expedient for the client.

As depicted in FIG. 1, following preprocessing stage 1010 in an exemplary workflow is a review stage 1020. During review stage 1020, a group of reviewers collaborate to identify and categorize a set of review documents (i.e. review set). In course of the process, each of the set of documents can be identified and categorized (through tags, for example) as non-responsive documents, responsive documents, privileged documents, work-product related, or confidential. The reviewers may redact portions of documents that are deemed confidential so they are not visible in the final version of documents produced to an opposing party. In addition to tagging and redacting, reviewers may also associate with documents specific comments (e.g., text information) and annotations (e.g., other types of information such as graphics, labels, etc.).

During review stage 1020, the scope of analysis may include an entire collection of electronic discovery materials (review set). A relevant set of summary information, such as key topics of the case, important people, specific vocabulary and jargon, and important individual documents are provided. This information should be provided early since they can be useful to help with strategic and tactical decisions that are need to be made throughout the discovery and litigation process. The information can be used to improve the efficiency by which discovery activities are carried out. In general, these analysis can be performed continually throughout the remainder of the process as new information is uncovered and issues of the case evolve.

As depicted in FIG. 1, an exemplary workflow also includes a production stage 1030. In this final stage of the discovery process, electronically stored information may be delivered to various recipients representing an opposing party, including law firms, corporate legal departments, service providers, etc. Production can involve delivering electronically stored information for use in other systems including automated litigation support system, web-based repository, etc. Production can also involve delivering electronically stored information on various media including CD, DVD, tape, hard drive, portable storage device, paper, other.

According to an embodiment, although this stage comes last in this list, it can be thought of as the first. It is the stage that ultimately drives the entire e-discovery process. Considerations of how one can most effectively present the electronically stored information at depositions, hearings and trial can influence and drive the production stage. If, for example, one wants a key witness to walk through a live spreadsheet at trial, one should probably not have produced the file only in paper form.

Figure 2:
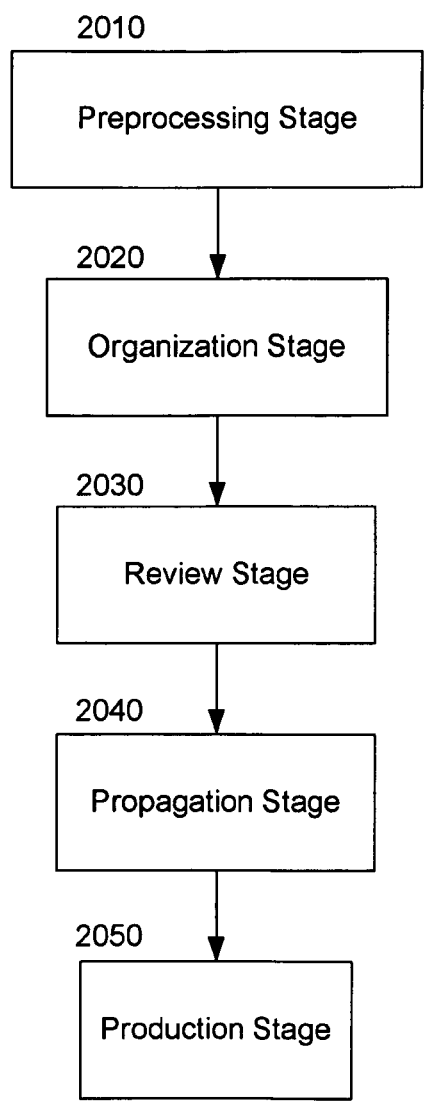
FIG. 2 is a simplified flow diagram illustrating an e-discovery workflow according to an embodiment.

FIG. 2 is a simplified flow diagram illustrating an e-discovery workflow according to an embodiment of the invention. An exemplary technique includes a step 2010 for pre-processing electronically stored information, a step 2020 for organizing related documents, a step 2030 for reviewing the organized documents, a step 2040 for propagating the review documents, and a step 2050 for delivering a marked up or annotated set of documents for final production.

Pre-processing (2010) includes, according to an embodiment, steps for identifying, collecting, and preserving electronically stored information. A goal of the step is to determine the scope, breadth and depth of electronically stored documents. To maintain and prove integrity, the step also involves collecting and preserving both content data as well as meta-data, including the owner, last access time, last modified time and external name of the content data. Depending on the embodiment, a unique hash value of the content using an MD5 or SHA1 hashing algorithm may be computed and placed as a wrapper to store and preserve the data.

Organization step (2020) is the process by which a set of related documents is identified and organized. According to an embodiment, a set of related documents may be organized by various information in the header sections of email documents. According to an embodiment, based on the information from the header, email documents can be organized into threads or conversations. Email documents can also be categorized and organized in other ways, such as in accordance with the identity of the senders and recipients, by dates sent and dates received, etc. Email documents can also be categorized and organized by keywords found in the body and attachments of email documents or categorized and organized manually by addition of meta information associated with the email documents.

Given the duplicity and scattering of email documents, email documents can also be organized into groups of exact duplicate and near duplicate documents. According to an embodiment, two documents with the same contents but different meta information—such as file modification dates, file creation dates, and file descriptions—are not considered exact duplicates but may be considered to be a part of a near-duplicate set of documents. According to another embodiment, if a document has undergone small edits between versions, the various versions can also be considered to be another set of near-duplicate documents. According to yet another embodiment, if an email document include attachments of a same document in various formats—for example, one in word, one in pdf, one in txt, one as part of the text of an email—all the emails with the various attachments in different file formats may also be considered to be another set of near-duplicate documents.

In organization stage 2020, as part of the process to identify and organize a set of email documents. When email documents are properly categorized and organized, it may become no longer necessary always to review individual copies of email documents. In most cases, groupings of emails can be reviewed. For example, thread of conversations can be reviewed and tagged instead of the reviewer having to review and then tag each individual email document. Individual review of different copies of duplicate documents also need not be required. With the proper categorization of duplicity, only one representative document—the master or pivot document—needs to be reviewed.

After organization step 2020 has been accomplished, a step 2030 for reviewing electronic stored information (ESI) is conducted next according to an embodiment. According to the embodiment, a reviewer may review each email document separately or by browsing through a set of related email documents. The reviewer may add or associate review content with each email document or groupings of email documents.

A reviewer may add comments as simply as by typing texts to be associated with the documents. An example of a simple comment information is a text-based note such as "this is an important email." The reviewer may annotate documents by associating the document with more sophisticated information such as graphics or audio information. An example of annotation information may be an image such as that of an image of a signature of a reviewer or a voice recording of a reviewer. The reviewer may also tag the documents with predefined tags or categories. An example of a set tags include tags such as "privileged," "not-responsive," "responsive" or "confidential." For example, a document of a credit card receipt may be marked "confidential." A document of an email in which a CEO attached an architect design of a new factory plan can be labeled with both "responsive" and "needs-further-review" tags.

The reviewer may also redact confidential or non-relevant portions of the documents by adding and associating redacting information with the email documents. Reacting is often necessary as part of the discovery process. Many email documents may need be produced because some parts are relevant to the dispute at hand, even though other parts of the document may be privileged, confidential, or otherwise not relevant to the dispute. In such instances, a reviewer may redact portions of an email document—including portions of an attachment. A reviewer can specify that a document should have lines 60-66 redacted, for example. In the documents finally produced, all related documents—for example, all version of a redacted attachment, including those that have been forwarded to various other recipients—will also have lines 60-66 redacted.

Depending on the embodiment, a document may undergo several reviews in several times. As a result, one or more review content—including comments, annotations, tags, and redaction information—each potentially created at different times and by different reviewers—may be associated with the document. In general, a complete history of the addition and modification of the review content is also maintained and incorporated as part of the review content.

In an embodiment, review content from different reviewers or different review sessions are ultimately aggregated to specify a final version of a document view produced for an opposing party. For example, if a first review session specified to redact lines 1-30 of a document and a second review session later specified to redact lines 99-103, then of the document and all related documents in the final produced documents, both groupings of lines, lines 1-30 and lines 99-103, will be redacted.

To maintain integrity of the reviewed document, each instance of review content (i.e. a comment, annotation, tag, redacting information, etc.) may be kept separate from the document, according to an embodiment. The documents are not directly altered. Instead, review content is create and stored outside a separate file and linked back to the documents. Depending on the embodiments, the review content may also be stored in a database and in a separate location. For ease of retrieving review contents associated with the documents, an index of all the review content may be associated with each email document. Such an index may be stored in a separate file, location or database, depending on the embodiment.

Another aspect of the current invention is enabling various review content to be associated with groupings of documents. The review content is then later propagated to one or more of the documents. In this manner, a reviewer is not required to inefficiently review each of the related set of documents. Instead, when a reviewer reviews email documents, review content can be associated with individual email documents one or more tags based on reviewing a subset of the entire grouping of documents.

As depicted in step 2040 of FIG. 2, after a group of email documents is reviewed, review content can be propagated to individual email documents. Propagation is a process by which after a set of email documents have been properly reviewed, review content is associated and propagated with one or more individual email documents. Depending on the number of review sessions and/or reviewers, review content associated with each document can also be ultimately aggregated to specify a final version of a document view produced for an opposing party.

Depending on the embodiment, while review content is typically propagated to all related documents, some review content can be associated only specific documents and are not propagated. In an example, an email may contain an attachment of a published market brochure that has been cleared for production while another email from the private email box of the vice president of marketing that contain an attachment of a brochure that includes sensitive comments regarding the company's strategic marketing decisions may not be cleared for production.

According to an embodiment, a reviewer may redact the additional comments by the vice president in the version of the attachment found in the vice president's email. The redaction applies only to the specific document and not to other copies that do not contain such comments. The redaction information is associated only with the private edition and not propagated or any of the other copies in the related set of documents.

In step 2050, email documents and other electronically stored information may be delivered to various types of litigation stakeholders, including attorneys, law firms, corporate legal departments, court clerks, etc. Production can involve delivering electronically stored information for litigation support system, web-based repository, etc. The media on which the documents are delivered include CD, DVD, tape, hard drive, portable storage device, e-paper, other. Depending on the specific embodiments, all the original source locations and custodians are also maintained and preserved for each document produced. In case there are issues with the produced documents and the original source needs to be retrieved, the original documents can be retrieved efficiently.

Figure 3:
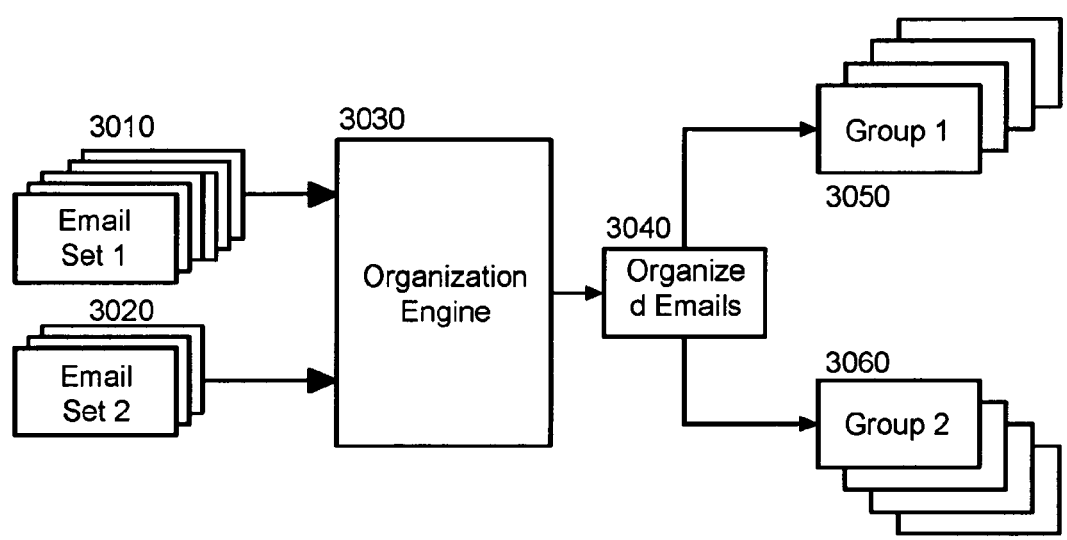
FIG. 3 is a simplified illustration showing the de-duplication of a set of documents according to an embodiment of the invention.

FIG. 3 is a simplified illustration showing the de-duplication of a set of documents according to an embodiment of the invention. On the left are depicted two exemplary sets of email documents (3010 and 3020) that may be delivered to a reviewer. An organization engine 3030 processes document sets 3010 and 3020 to organize document sets 3010 and 3020 into organized email documents 3040, which in this case include a first group of email documents 3050, and a second group of email documents 3060. Depending on the embodiments, the two groups of email documents may represent email threads or conversations. A thread or conversation is a collection of related email documents. The collection arises from an original message that may have been sent to one or more recipients and that may have subsequently been replied to and/or forwarded, perhaps multiple times.

In another embodiment, the two groups of email documents can represent a group of exact duplicate email documents and a group of near-duplicate email documents. Examples of exact-duplicates include exact copies of an email message such as those received by common recipients of an email document. Examples of near-duplicate email documents include messages that are almost identical to each other except for differences in meta information, minor formatting changes, or actual formats used to store the files. Examples of near-duplicate documents may include documents that have been forwarded with minimum to no alterations or additions. Two copies of an email, one original copy, and one forwarded to another person may also be considered near duplicates. Email messages saved in different formats, such as Microsoft outlook mail message format or MAC OS X mail message format, may also be regarded to be near duplicate email documents, according to an embodiment.

Figure 4A:
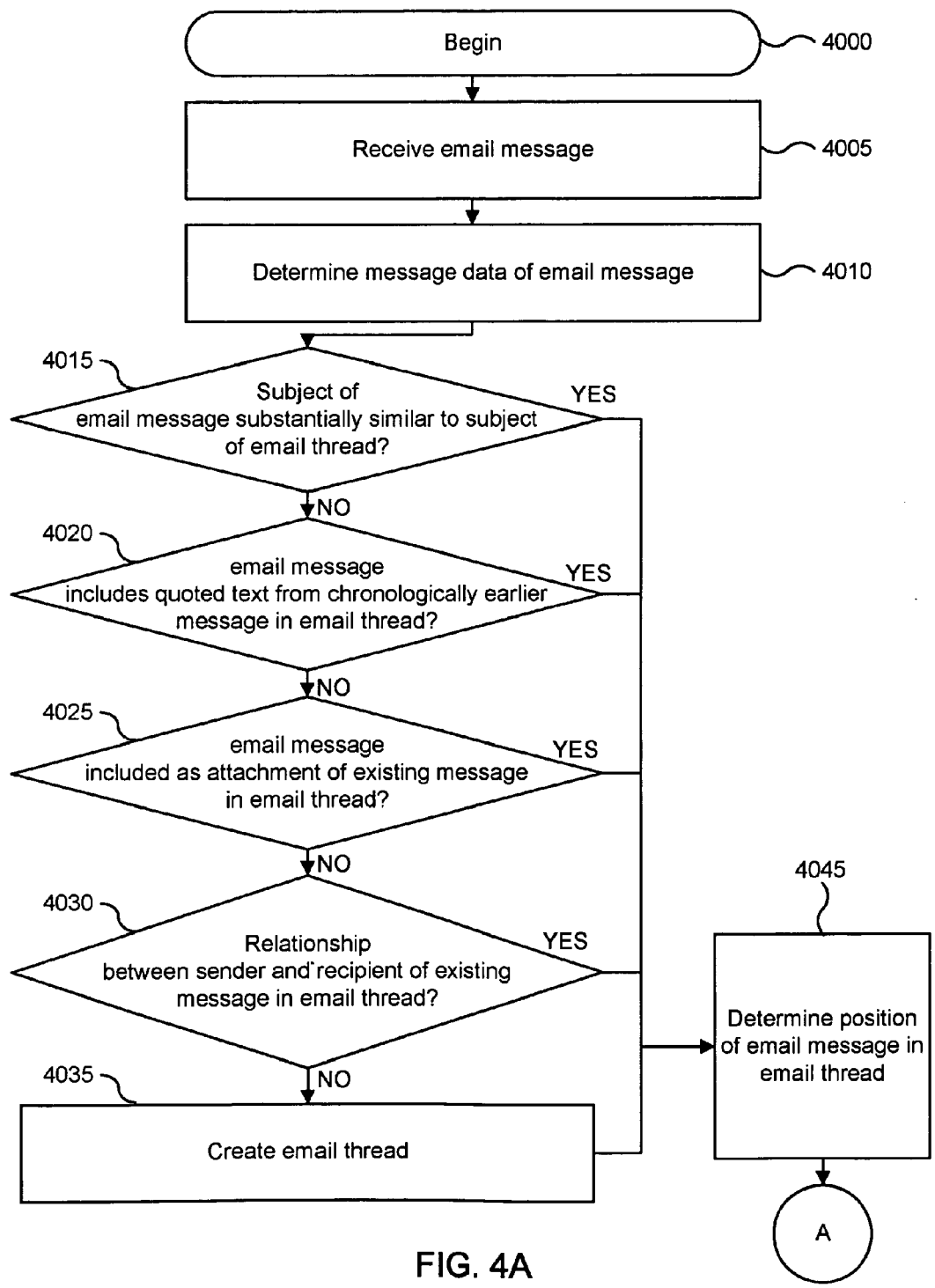
FIG. 4A and FIG. 4B are simplified flowcharts of techniques for organizing an email message according to an embodiment.
Figure 4B:
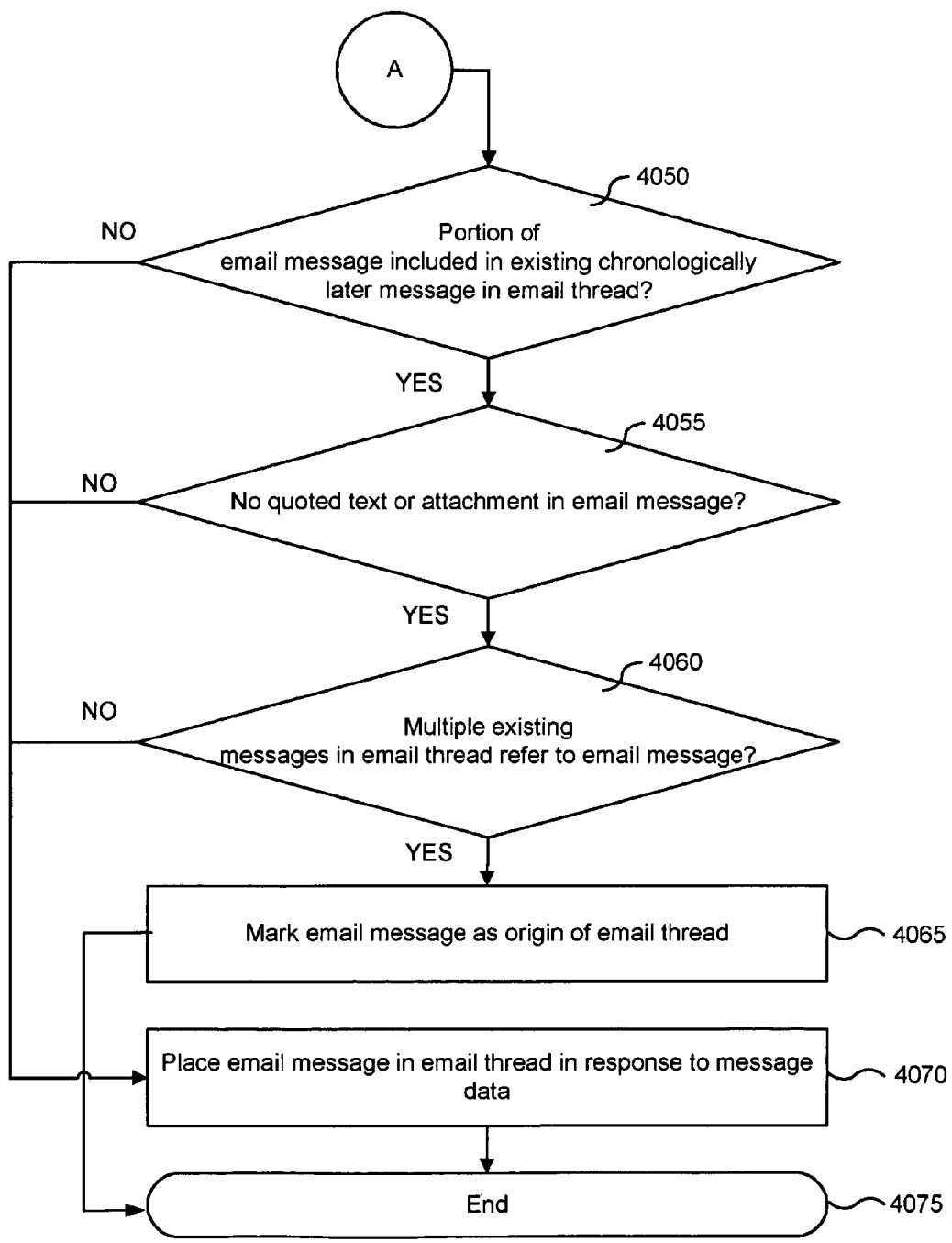

FIG. 4A and FIG. 4B are simplified flowcharts of techniques for organizing an email message, such as organizing email documents into threads or conversations according to an embodiment. FIG. 4A begins in step 4000. In step 4005, the techniques include receiving an email mail message and determining message attribute data of the email message, such as sender identifier, recipient identifier, subject, timestamps, and the like (step 4010).

In step 4015, a determination is made on whether the subject of an email message (e.g., from the message attribute data) is substantially similar to the subject of an email thread. If the subjects are not similar, a determination is made on whether the email message includes quoted text from a chronologically earlier email message in the email thread (step 4020). If the email message does not include quoted text, a determination is made on whether the email message includes an attachment of an existing email message in the email thread (step 4025).

If the email message is not included as an attachment, a determination is made on whether a relationship exists between a sender of the email message and a recipient of an existing email message in the email thread (step 4030). If all of the determinations result in the negative, a new email thread with the subject of the email message is created. If a positive determination is made, the message is deemed to be part of the email thread, and a determination is made regarding the position of the email message within the corresponding email thread (step 4045).

Referring to FIG. 4B, in step 4050, a determination is made on whether a portion of the email message is included in a subsequent email message in the email thread. If a positive determination is made, a determination is made regarding whether there is any quoted text or attachments such as that which would indicate an earlier derived email message. If another positive determination is made, a determination is made on whether multiple existing email messages in the email thread refer to the email message.

If a positive determination is made in steps 4050, 4055, and 4060, the email message is determined to be an origin of the email thread. In general, the origin of an email thread is an email message that initiated the sending of subsequent email messages forming a logical discussion or conversation. Typically, the subsequent email messages have similar subjects as the origin email address or refer to the origin email message. The subsequent email messages may also include all or a portion of the original email address as quoted text or as an attachment.

In step 4070, the email message is placed in the email thread in response to the message data. If a negative determination in the steps 4050, 4055, and 4060, the email message is placed in the email thread in response to the message attribute data. In the embodiment, a computer system organizes the email message chronologically. By identifying the relationships between the email messages using information such as sender and recipient, quoted text, attachments, and the like, the computer system can be used to place the email message chronologically in context of the email thread.

In various embodiments, as a computer system incrementally receives email messages, the email message may not be received in chronological order, or any order for that matter. In response, computer system may continuously "promote" or "demote" processed email messages as the origin of an email thread. Computer system may continuously organize the email thread in response to processed email messages, altering relationships and updating the positions of email messages in the thread in response to message attribute data of the email messages. FIG. 4B ends in step 4075.

In various embodiments, a computer system can be designed to process email threads (e.g., transactional email messages and derived email messages) to determine an ordering associated with the email threads. A benefit provided by various embodiments is that the computer system can be used to sort, analyze, and process captured information in transactional and derived email messages into email threads that may be ordered based on different criteria, such as time, topic, rank, and relevance.

In general, a system for ranking electronic messages includes a processor. The processor receives a plurality of email messages and determines a plurality of email threads in response to the plurality of email messages. The processor determines an email rank associated with each email message in the plurality of email threads. The processor determines an email rank associated with an email message in response to a sender identifier related to the email message.

The processor determines a thread rank for each email thread in the plurality of email threads. The processor determines a thread rank associated with an email thread in response to email ranks of each email message associated with each respective email thread. The processor then determines an ordering of the plurality of email threads in response to the thread rank associated with each email thread in the plurality of email threads.

Figure 5:
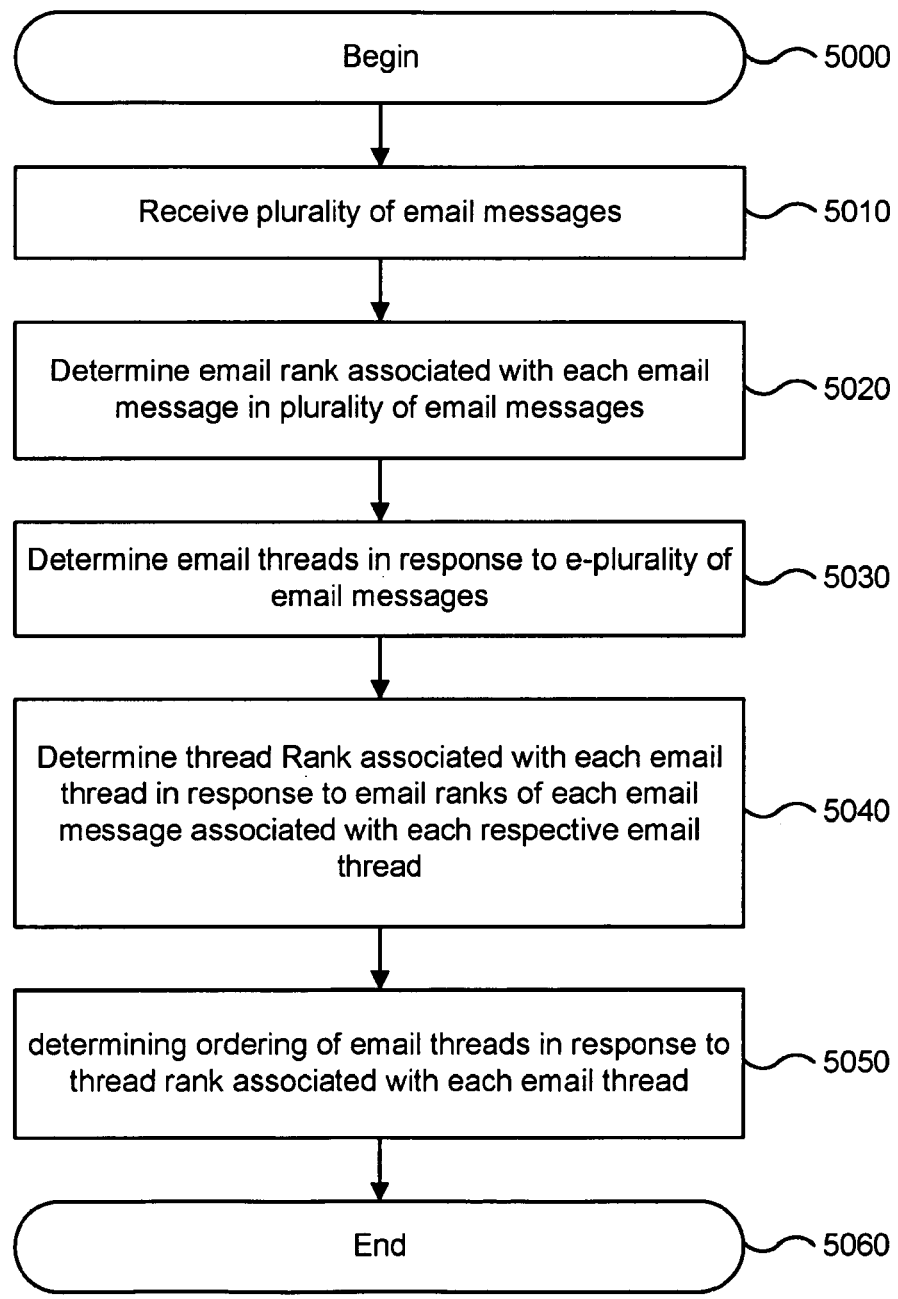
FIG. 5 is a flowchart for ordering email threads in one embodiment according to an embodiment of the present invention.

FIG. 5 is a flowchart for ordering email threads in one embodiment according to the present invention. FIG. 5 begins in step 5000. In step 5010, a computer system can be configured to receive a plurality of email messages. In step 5020, the computer system determines the email rank associated with each email message in the plurality of email messages.

In step 5030, the computer system determines email threads in response to the plurality of email messages. In step 5040, the computer system determines a thread rank associated with each email thread in response to email ranks of each email message associated with each respective email thread. In one example, the thread rank is a weighted average of the email ranks associated with the email message in an email thread.

In step 5050, the computer system determines an ordering of the email threads in response to the thread ranks of each email thread. The computer system then may display the ordering to a user or generate a report containing the ordering. The ordering of email threads allows a user or organization to determine which communications or conversations embodied in email threads are most active or most relevant to a topic or other search criteria. FIG. 5 ends in step 5060.

Advantageously, computer system can display the ordering of the email thread to a user. For example, computer system can provide the user with an ordering of email threads based on a search performed for discussions or communications related to organization trade secrets. In another example, computer system displays an ordering of the most active or highly discussed topics or categories in an organization.

Figure 6A:
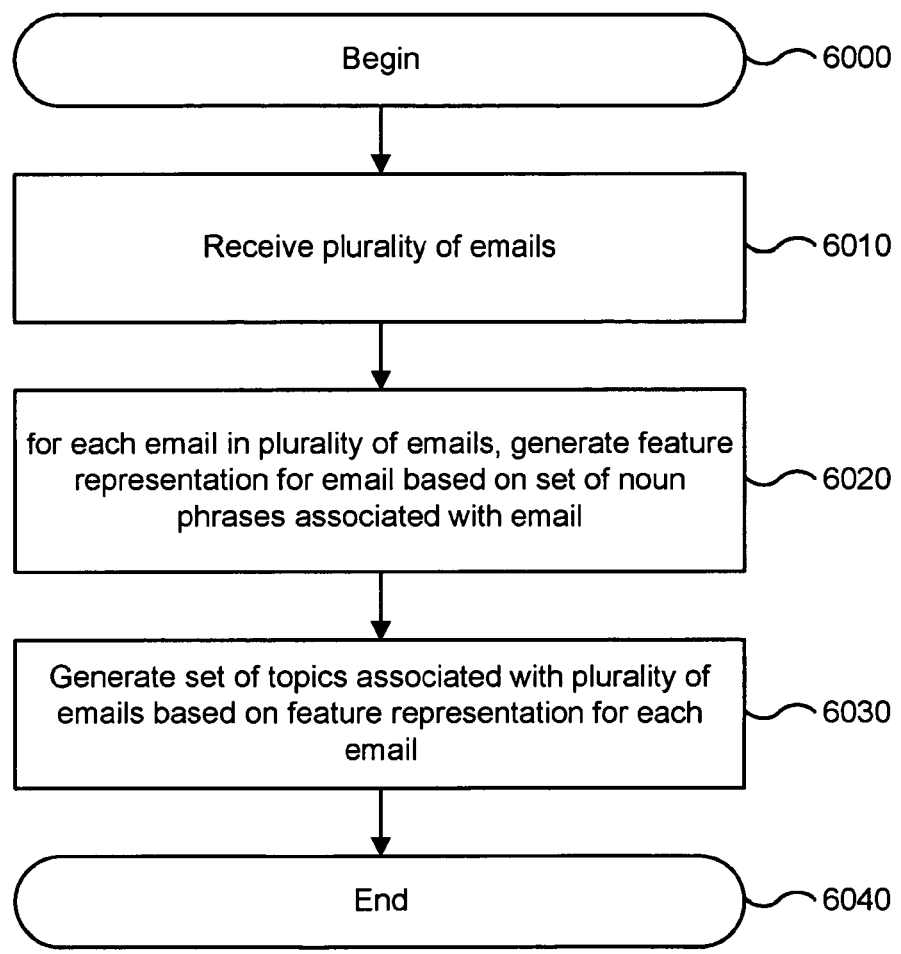
FIG. 6A is a simplified flowchart of a method for classifying emails into topics in one embodiment.

FIG. 6A is a simplified flowchart of a method for classifying emails into topics in one embodiment according to the present invention. The processing depicted in FIG. 6A may be performed by software modules (e.g., instructions or code) executed by a processor of a computer system, by hardware modules of the computer system, or combinations thereof. FIG. 6A begins in step 6000.

In step 6010, a plurality of emails is received, where the emails can be obtained from a plurality of emails from an email message store, such as an Exchange Server, an IMAP server, a PST file, and the like. In step 6020, for each email in the plurality of emails, a feature representation for an email is generated based on a set of noun phrases (NPs) associated with the email. In general, a feature representation is any set, collection, fingerprint, vector, and the like that represents one or more features or properties associated an email. In various embodiments, a feature representation includes a feature vector that represents a scoring of noun phrases contained in the email document.

In step 6030, a set of topics is generated associated with the plurality of emails based on the feature representation for each email. For example, a cluster of emails may be determined based on similarities in the feature representations of the emails. The cluster itself may represent a topic, or a concentrated portion of the cluster, or a centroid may be used to identify the topic from the cluster of common or similar noun phrases. FIG. 6A ends in step 6040.

Figure 6B:
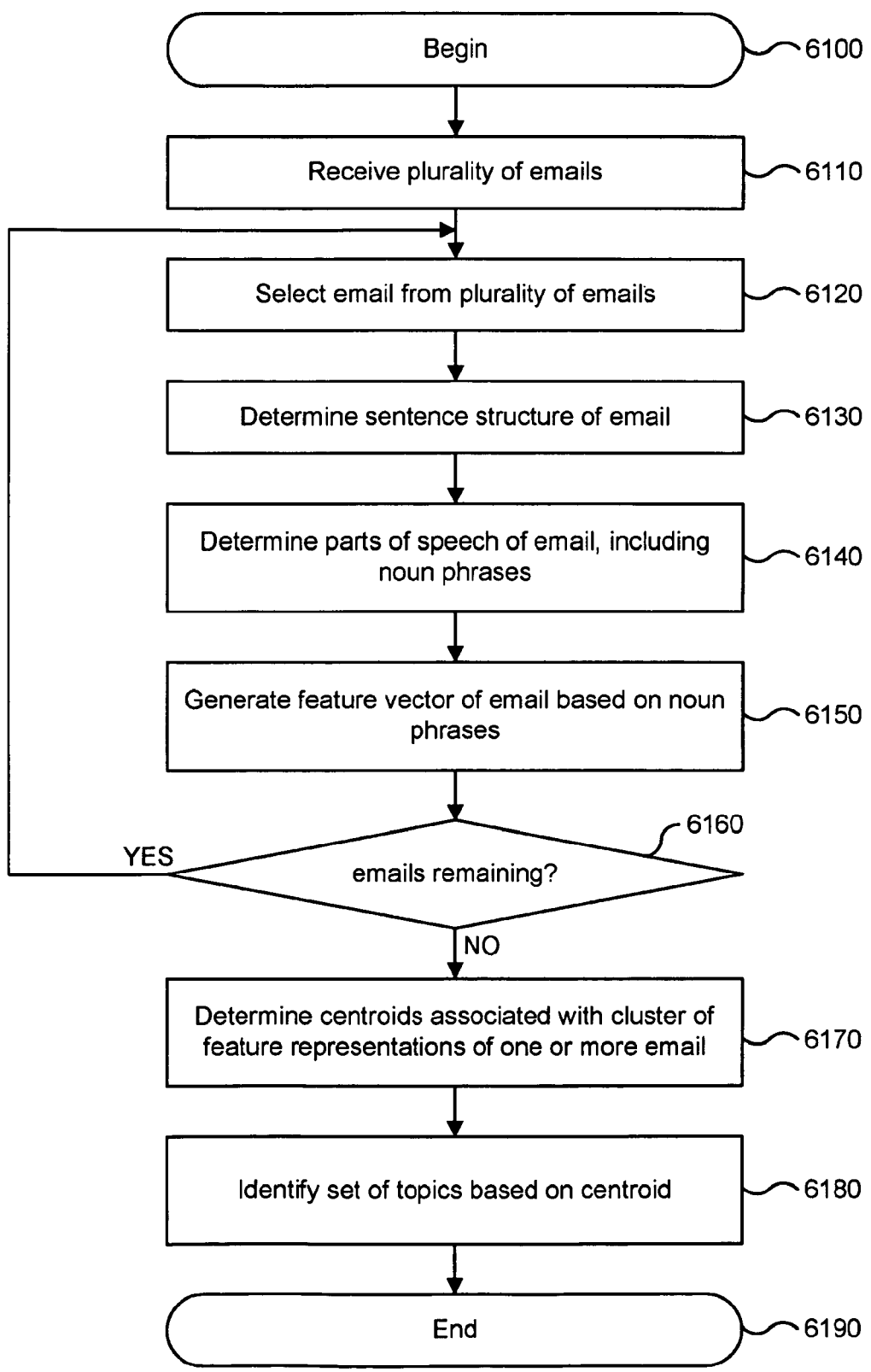
FIG. 6B is a flowchart of a method for identifying topics based on feature vectors associated with emails in one embodiment.

FIG. 6B is a flowchart of a method for identifying topics based on feature vectors associated with emails in one embodiment according to the present invention. The processing depicted in FIG. 6B may be performed by software modules (e.g., instructions or code) executed by a processor of a computer system, by hardware modules of the computer system, or combinations thereof. FIG. 6B begins in step 6100.

In step 6110, a plurality of emails if received. In step 6120, an email from a plurality of emails is selected. In step 6130, the sentence structure of the email is analyzed. In some embodiments, linguistic analysis may be performed to determine the sentence structure.

In step 6140, parts of speech of the email, including noun phrases, may be determined. For example, linguistic and/or statistical analysis can be performed on the email to decompose the email into noun phrases. In step 6150, a feature vector of the email may be generated based on the noun phrases.

In step 6160, a determination on whether there are any emails remaining in the plurality of emails may be carried out. If there are emails remaining, processing continues at step 6120 where another email from the plurality of emails is selected.

If there are no more emails remaining, in step 6170, centroids associated with clusters of feature vectors of one or more emails may be determined. A centroid may include an entire cluster. A centroid may further include a number of similar feature vectors that satisfy or exceed a limit or threshold.

In step 6180, a set of topics may be identified based on the centroids. For example, each centroid may represent a single topic. In some embodiments, a hierarchy of topics is determined. FIG. 6B ends in step 6190.

Figure 7A:
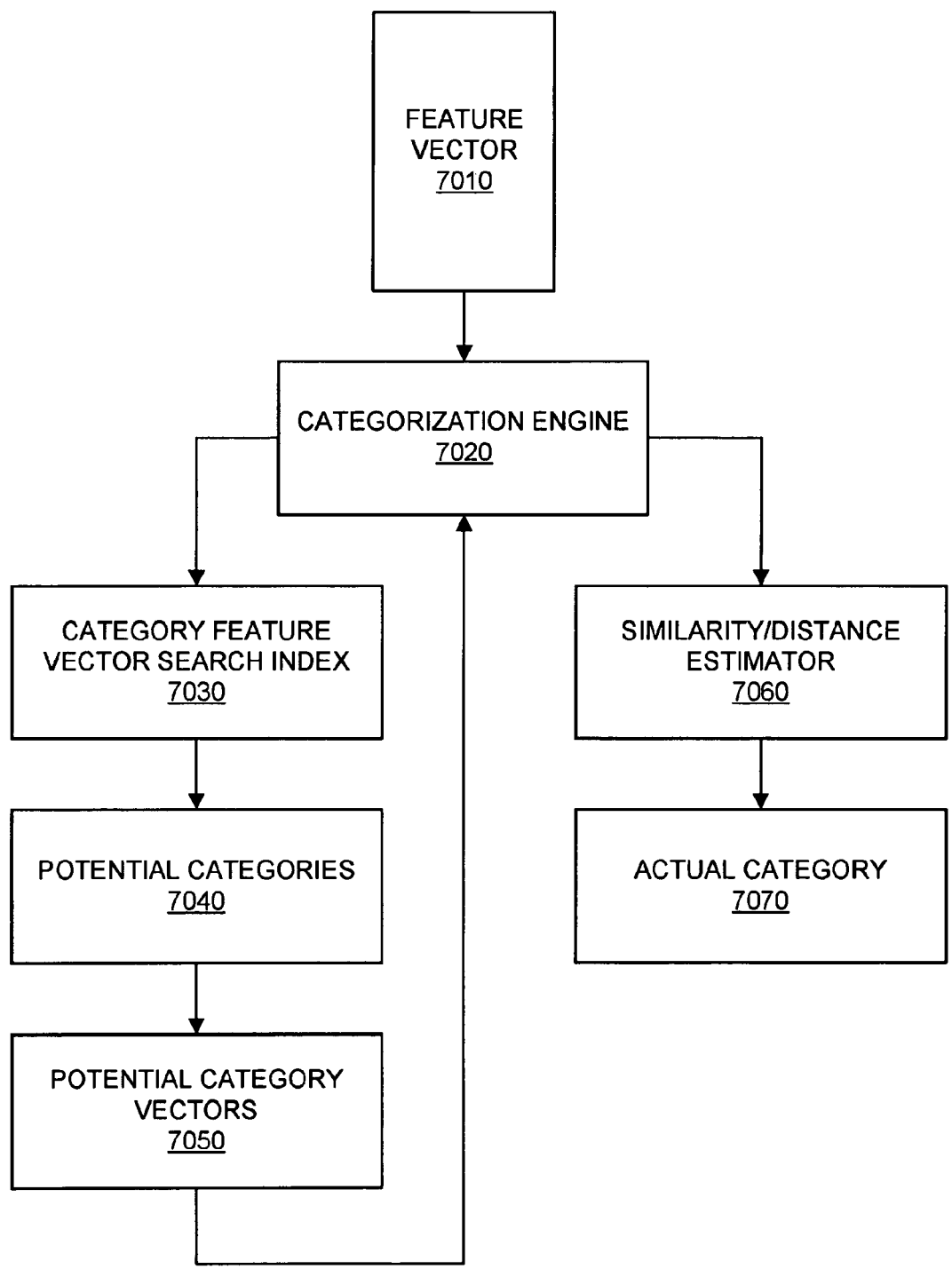
FIG. 7A is a block diagram illustrating automatic categorization in one embodiment.

FIG. 7A is a block diagram illustrating automatic categorization in one embodiment according to the present invention. The processing depicted in FIG. 7A may be performed by software modules (e.g., instructions or code) executed by a processor of a computer system, by hardware modules of the computer system, or combinations thereof. In an embodiment example, a Feature vector 7010 for each email document is input into Categorization Engine 7020. Categorization Engine 7020 then performs a search into a Category Feature Vector Search Index 7030. Category Feature Vector Search Index 7030 maps the 10-20 feature vector words of the email document to a set of Potential Categories 7040.

Potential Category 7040 makes a selection based on the relevance score exceeding a certain threshold, so between 5-10 potential categories are determined. The feature vector of each category is extracted in Potential Category Vectors 7050. Similarity/Distance Estimator 7060 computes a similarity distance between the feature vector of the document and the feature vector of the category. If the similarity score is high enough, the category is assigned in Actual Category 7070 for the email document. If the document does not match any category, the email document is assigned as un-categorized.

Figure 7B:
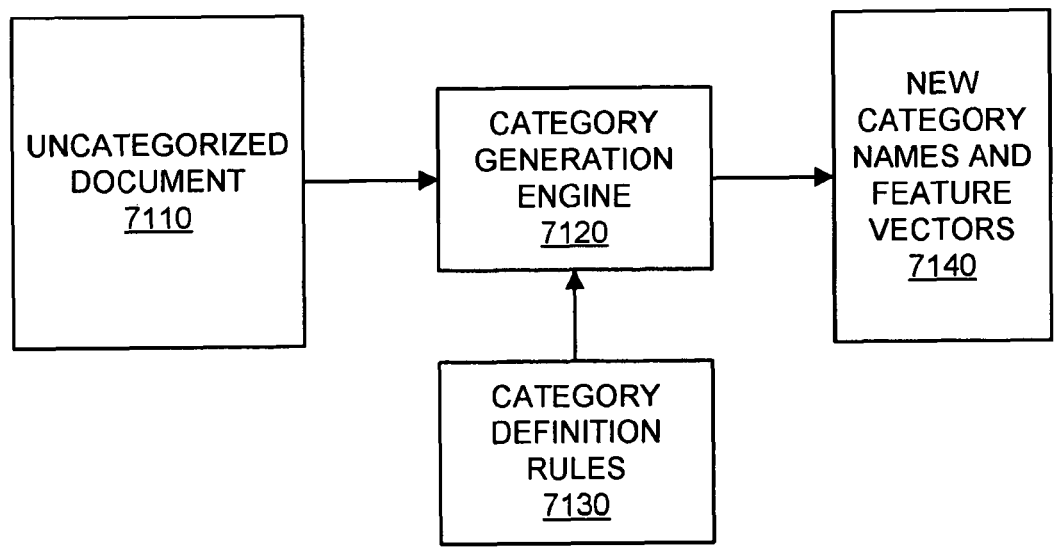
FIG. 7B is a block diagram illustrating topic creation in one embodiment.

FIG. 7B is a block diagram illustrating topic creation in one embodiment according to the present invention. Based on a periodic schedule, un-categorized documents 7110 may be examined to determine if it is necessary to create new categories. The feature vector of uncategorized documents is fed into Category Generation Engine 7120. Category Generation Engine 7120 uses categorization rules from Category Definition Rules 7130, and creates new categories along with feature vectors for these new categories in New Category Names and Feature Vectors 7140. Typically, each feature vector for a category is restricted to be between 20-50 words, which provides just enough words to discriminate the category from other categories. In some embodiments, scores are maintained for the feature vectors, so an ordered list of vector entries is always available.

In general, the top five entries of a feature vector should be enough to classify an email document into its category. The other entries are maintained so that, when the category does not discriminate well enough causing too many documents to appear in one category, the remaining entries of the feature vector can be used to split the category into sub-categories. In some embodiments, when an email document is added to a category, the category feature vector is updated, with additional scores from the email document that was added. Statistics may be maintained, such as the number of documents in the category, which may be used to determine if there is a need to split the category.

Figure 8A:
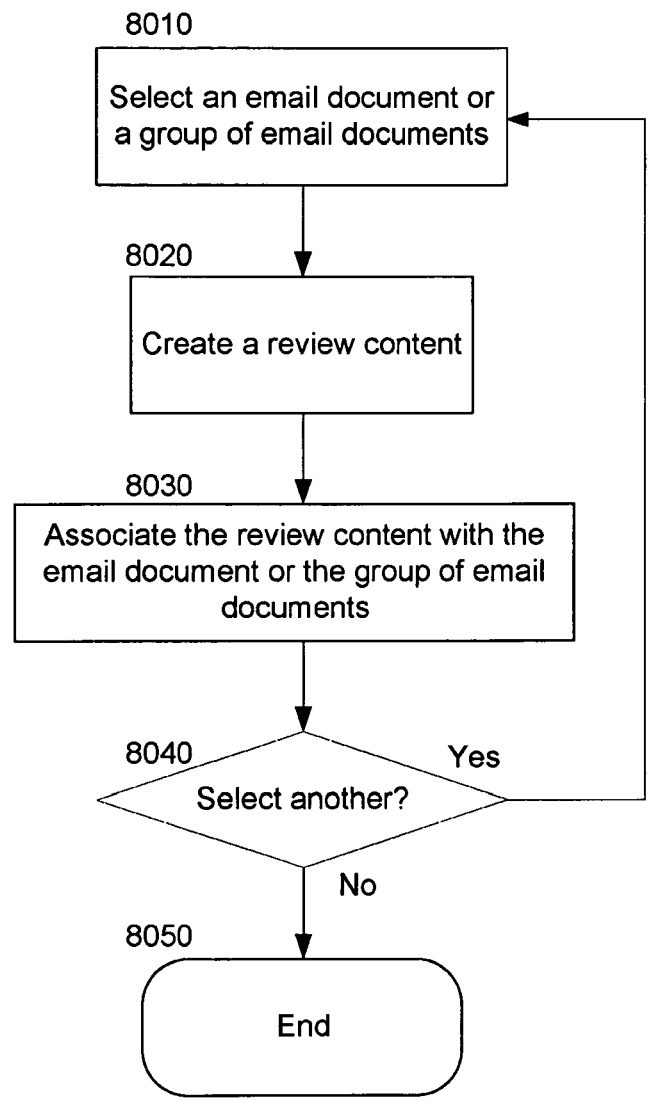
FIG. 8A is a simplified illustration showing a technique for adding and associating review content (e.g., a tag) with an email document.

FIG. 8A is a simplified illustration showing a technique for adding and associating review content (e.g., a tag) with an email document. The processing depicted in FIG. 8A may be performed by software modules (e.g., instructions or code) executed by a processor of a computer system, by hardware modules of the computer system, or combinations thereof.

The process starts with selection of a document or a grouping of document (e.g., a thread) for review (step 8010). Next, a reviewer creates new review content for the document (step 8020). The types of content created can vary. In some cases, a reviewer may create text or other annotation information to be associated with the document. Tags may also be created and associated with documents. According to an embodiment, a reviewer may select tags to mark otherwise flag documents. The tags can be used to organize the production documents and/or to make the production documents searchable with terms specified by the tags. A reviewer may also redact parts of a document by creating redacting information to be associated with the document.

In step 8030, review content including one or more of the above information is associated with the document or the grouping of documents. Typically, reviewers may associate review content only with the master or pivot document. Later, during de-duplication, the review content can be propagated to each of the exact-duplicate and near-duplicate documents. Reviewers may however also create review contents to be associated directly with documents other than master or pivot documents. Depending on the embodiments, the reviewer may specify for each specific review content whether the specific review content is to be propagated to all related documents, to specific related documents, or not to be propagated at all. Depending on that information, the review content may later be propagated to all related documents, to specific related documents, or not to be propagated at all. Step 8040 provides an opportunity for a reviewer to decide whether to select another document or another grouping of documents for review.

Figure 8B:
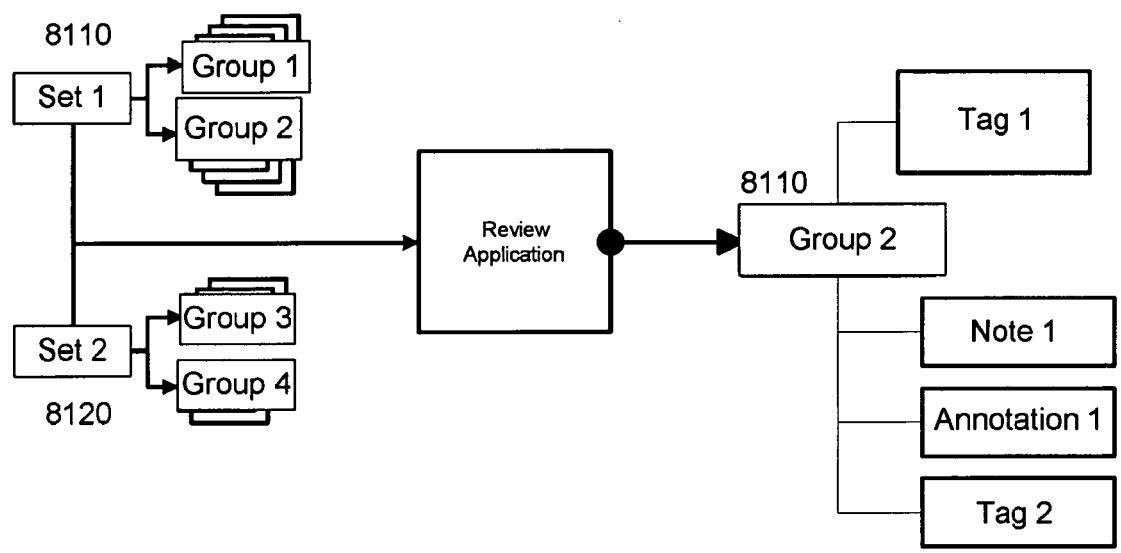
FIG. 8B is a simplified illustration showing the reviewing of a related set of documents.

FIG. 8B is a simplified illustration showing the reviewing of a related set of documents. In the example, two sets of documents 8110 and 8120 are reviewed. To review one of the set of documents, a reviewer selects the sets of documents to review. The sets of documents are categorized into four groups—Group 1, Group 2, Group 3, and Group 4. In the example shown, Group 2 is selected for review. The review process allows a reviewer to add and associate various review content with the group. Review comment such as annotation, comment, tag, and redacting information can be added and later propagated to individual email documents within the group, depending on the embodiment.

As a result of the review process, four pieces of review content are created in the example—Tag 1, Tag 2, Note 1, and Annotation 1. These review content are then associated with Group 2. Depending on the embodiment, the review content can be propagated to each of the documents in Group 2 or only to some of the review contents within Group 2. It is possible for example that only Tag 1 and Note 1 are propagated to each of the documents in Group 2; Tag 2 is propagated to a few select documents within Group 2; and Annotation 1 is associated with a specific document and not propagated to any of the other documents.

Figure 9A:
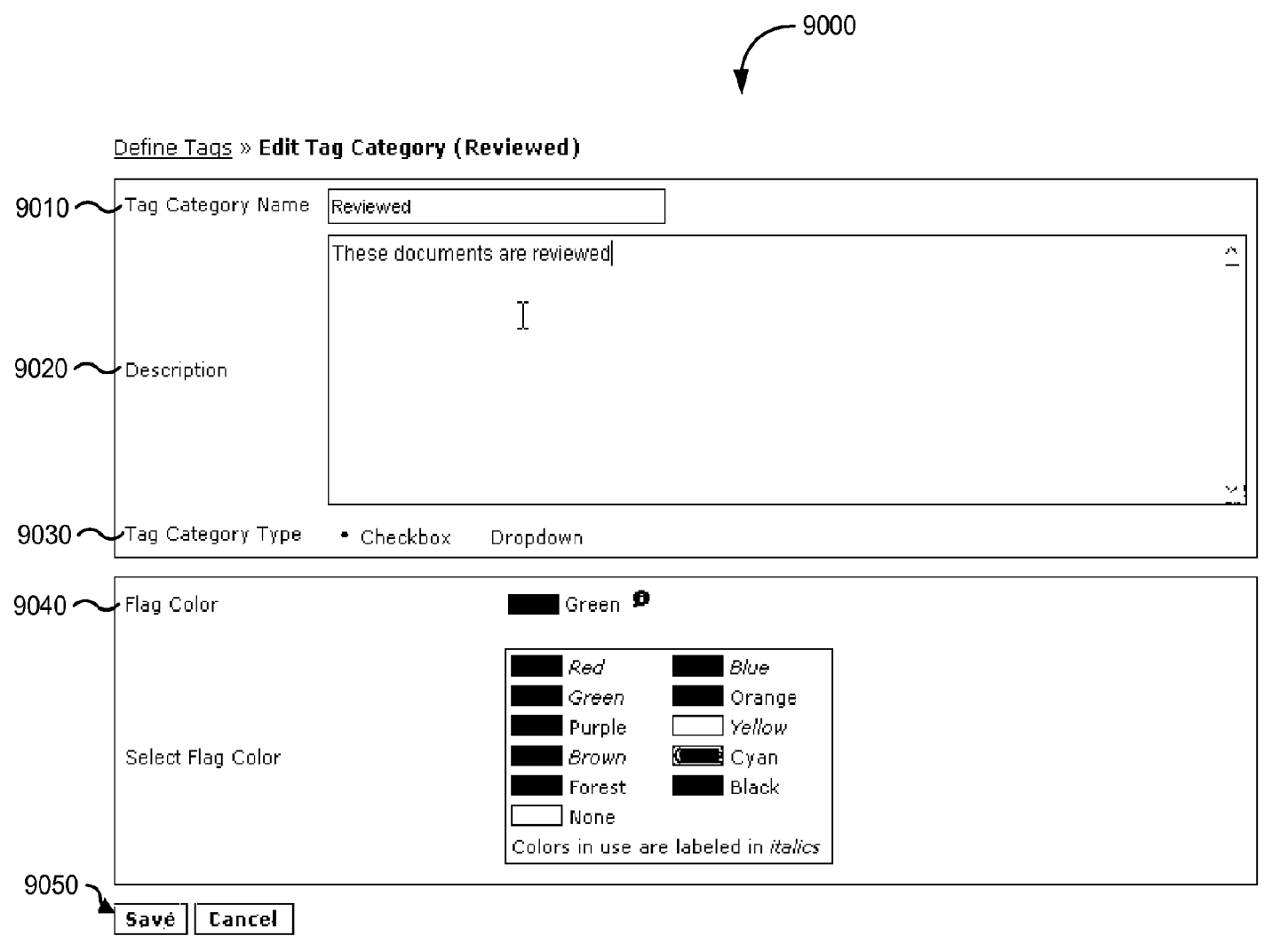

FIG. 9A is a simplified illustration of a graphical user interface (GUI) 9000 for creating a predefined tag for labeling one or more email documents according to an embodiment. GUI 9000 allows user to enter a name 9010 and a description 9020 for a tag. GUI 9000 allows various attributes to be specified for the tag, including, for example, whether a tag should later be selected as a checkbox or a dropdown (screen section 9030). GUI 9000 also allows a color to be associated with the tag (screen section 9040). When the user is done, the user is given an option to save or cancel the definition for the tag (screen section 9050).

Figure 9B:
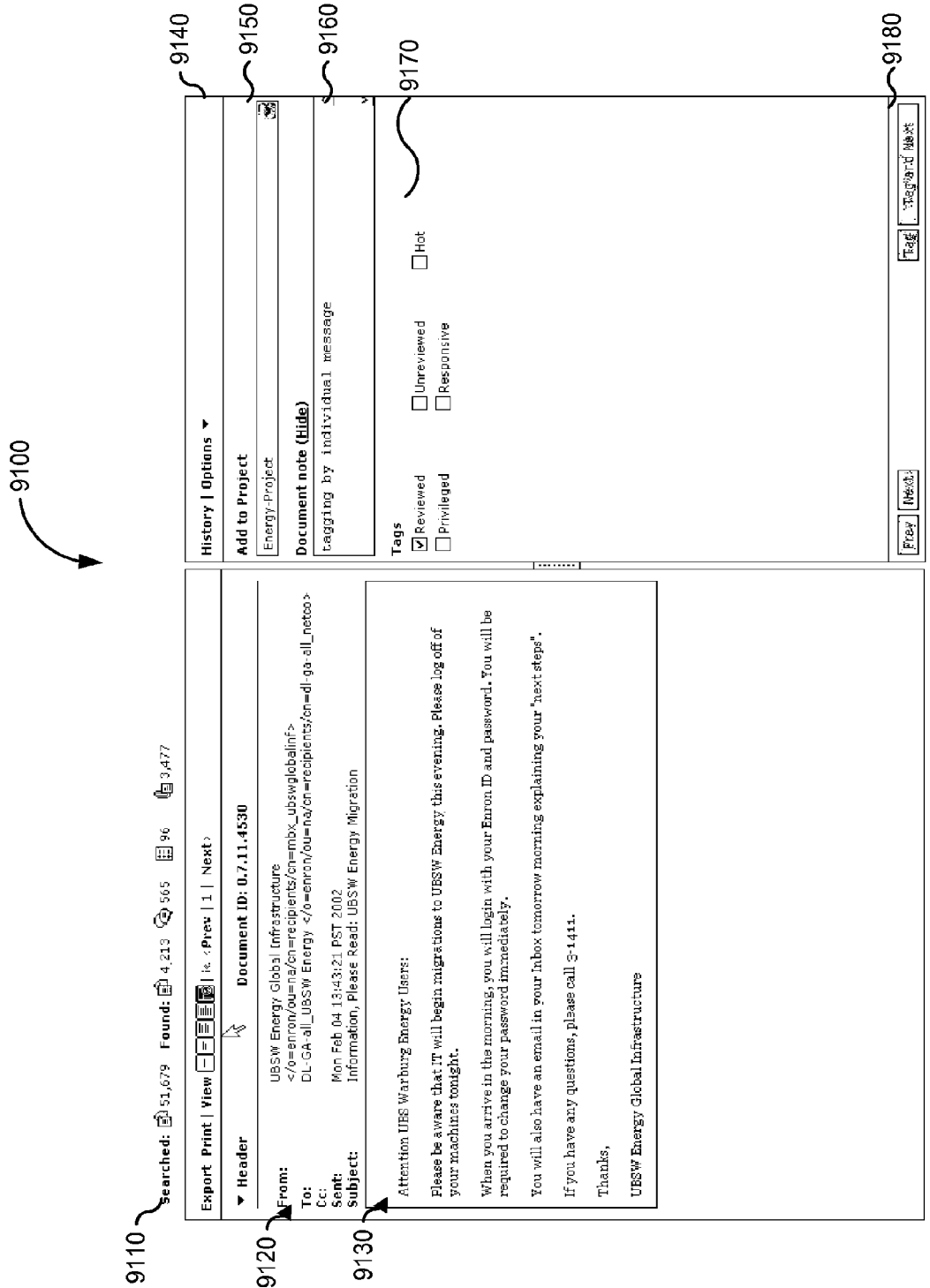
FIG. 9B is a simplified illustration of a GUI for reviewing and tagging an email document in an email group according to an embodiment.

FIG. 9B is a simplified illustration of a GUI 9100 for reviewing and tagging an email document in an email group according to an embodiment. In the example, a search for a keyword "energy" returns a number of documents of different types containing the term (screen section 9110). In reviewing an email document, GUI 9100 displays both header and meta information 9120 as well as content of the document 9130. As shown in both sections 9120 and 9130, the keyword "energy" has been highlighted for a current email throughout sections 9120 and 9130 wherever they are found.

GUI 9100 also includes a section of the screen (9140) associating review content with the email document. Section 9150 allows a reviewer to add the current email document to a project. Section 9160 allows a reviewer to associate a note with the current email document. Section 9170 allows a reviewer to associate one (or more) of several predefined tags with the current email document. Depending on the situation, a reviewer may tag the current email document and move on to a next document to review and tag (screen section 9180).

FIG. 9C is a simplified illustration of a GUI 9200 for reviewing and tagging a discussion thread. In the example, a criteria (not shown in the figure) returns a number of email groups or threads containing email documents conforming with the criteria (screen section 9210). In the example, GUI 9200 allows a group or thread to be added to or associated with a project (screen section 9220). GUI 9200 also allows one or more tags to be associated with an email thread or group (screen section 9230). For example, a reviewer may upon selecting a thread or group, tag all emails in the thread or group as "reviewed," untag all emails in the thread or group as "unreviewed," and leave as it is for all emails in the thread or group tags with respect to "hot," "privileged," and "responsive."

Using GUI 9200, a reviewer may associate a comment with more than one thread or group (screen section 9240). Screen section 9250 shows a list of threads or groups. A reviewer may apply tag actions specified in 9230 to all threads or groups of emails or a few groups or threads (screen section 9260). Depending on the embodiments, a summary of the actions taken can be emailed to a supervisor as appropriate (screen section 9270).

Figure 10A:
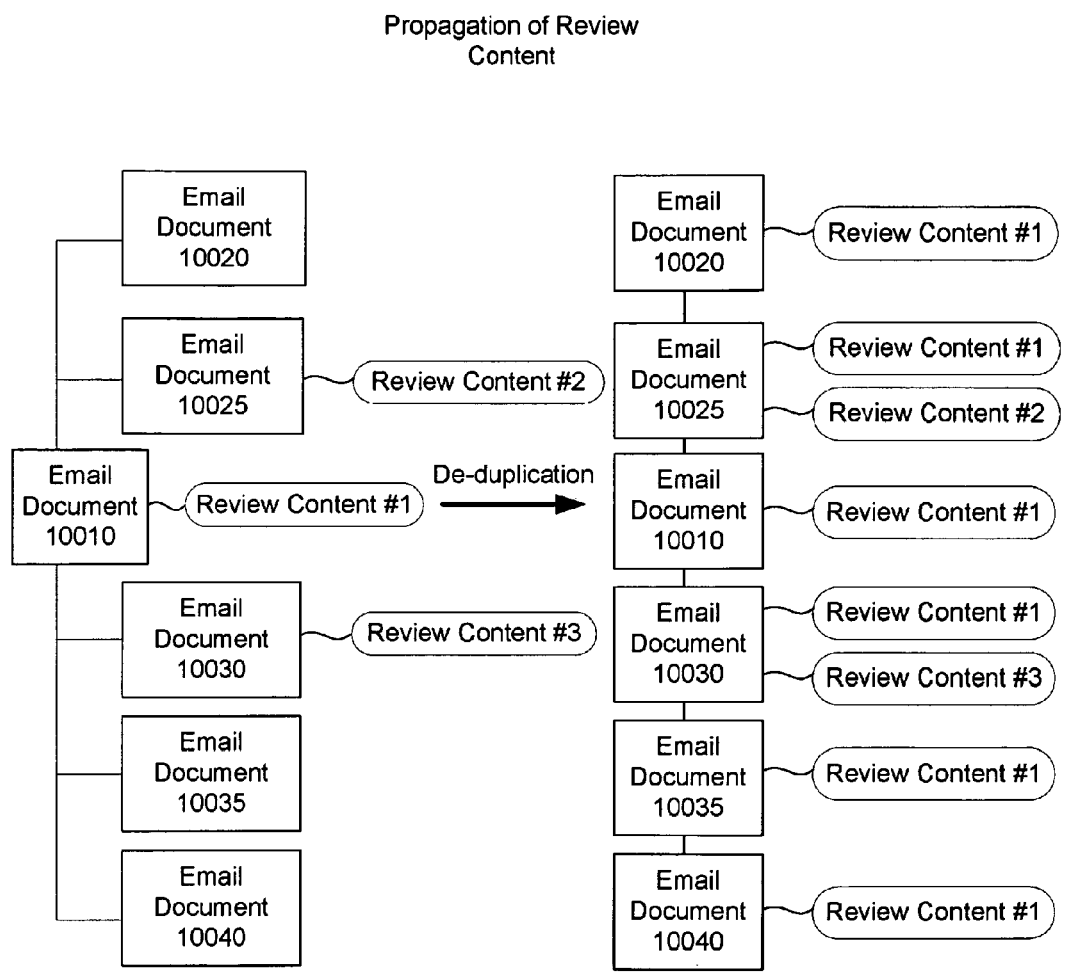
FIG. 10A is a simplified illustration of a process for propagating review content to individual email documents of a group or thread according to an embodiment.

FIG. 10A is a simplified illustration of a process for propagating review content to individual email documents of a group or thread according to an embodiment. A group or thread of document includes email document 10020, email document 10025, email document 10010, email document 10030, email document 10035, and email document 10040. As illustrated on the left side of the figure, three documents (email document 10010, email document 10020, and email document 10030) are explicitly reviewed and assigned review content. In the example, a review content #1 is associated with email document 10010; a review content #2 is associated with email document 10025; and a review content #3 is associated with email document 10030.

According to the embodiment, upon propagation, review content #1 is propagated to each of the other email documents of the group or thread—including, in this example, email documents 10020, 10025, 10030, 10035, and 10040. If the reviewer has specified that both review content #2 and review content #3, unlike review content #1, to be associated with email documents 10025 and 10030 only, respectively, then in the final set of documents created, neither review content #2 nor review content #3 are propagated, with review content #2 associated only with document 10025 and review content #3 associated only with document 10030 (see right side of FIG. 10A).

Figure 10B:
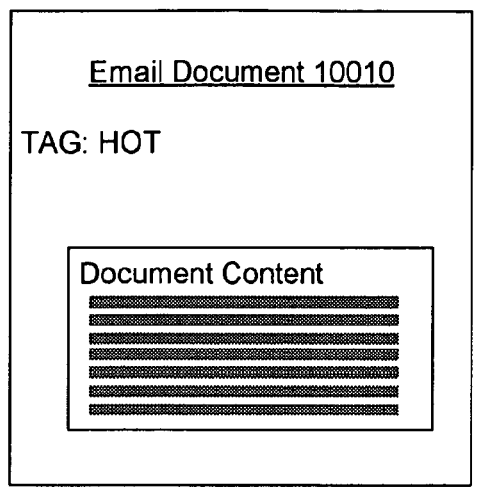
FIG. 10B is a simplified illustration of an embodiment of a result of the propagation process shown in FIG. 10A.
Figure 10B:
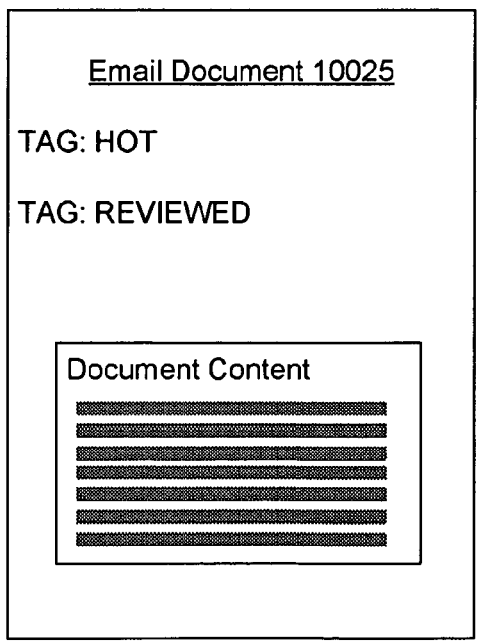
Figure 10B:
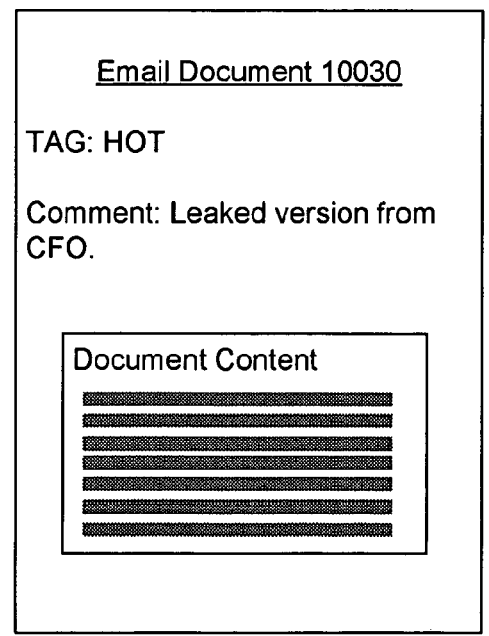

FIG. 10B is a simplified illustration of an embodiment of a result of the propagation process shown in FIG. 10A. According to the embodiment, the tag "hot" is specified by review data #1. Because this data is propagated to each of the documents in the group or thread, email document 10010, email document 10025, and email document 10030—among others (not shown)—all are shown to be associated with the tag "hot."

According to the embodiment, the tag "reviewed" is specified by review data #2. In the case, the reviewer had not set review data #2 to be propagated to any other documents. Because this data had not been specified to be propagated, the tag "reviewed" is associated only with email document 10025 and not any of the other documents belong to the group or thread. The comment "Leaked version from CFO" is specified by review data #3. Because this data had not been specified to be propagated, this comment is associated only with email document 10025 and not any of the other documents belonging to the group or thread.

Figure 10C:
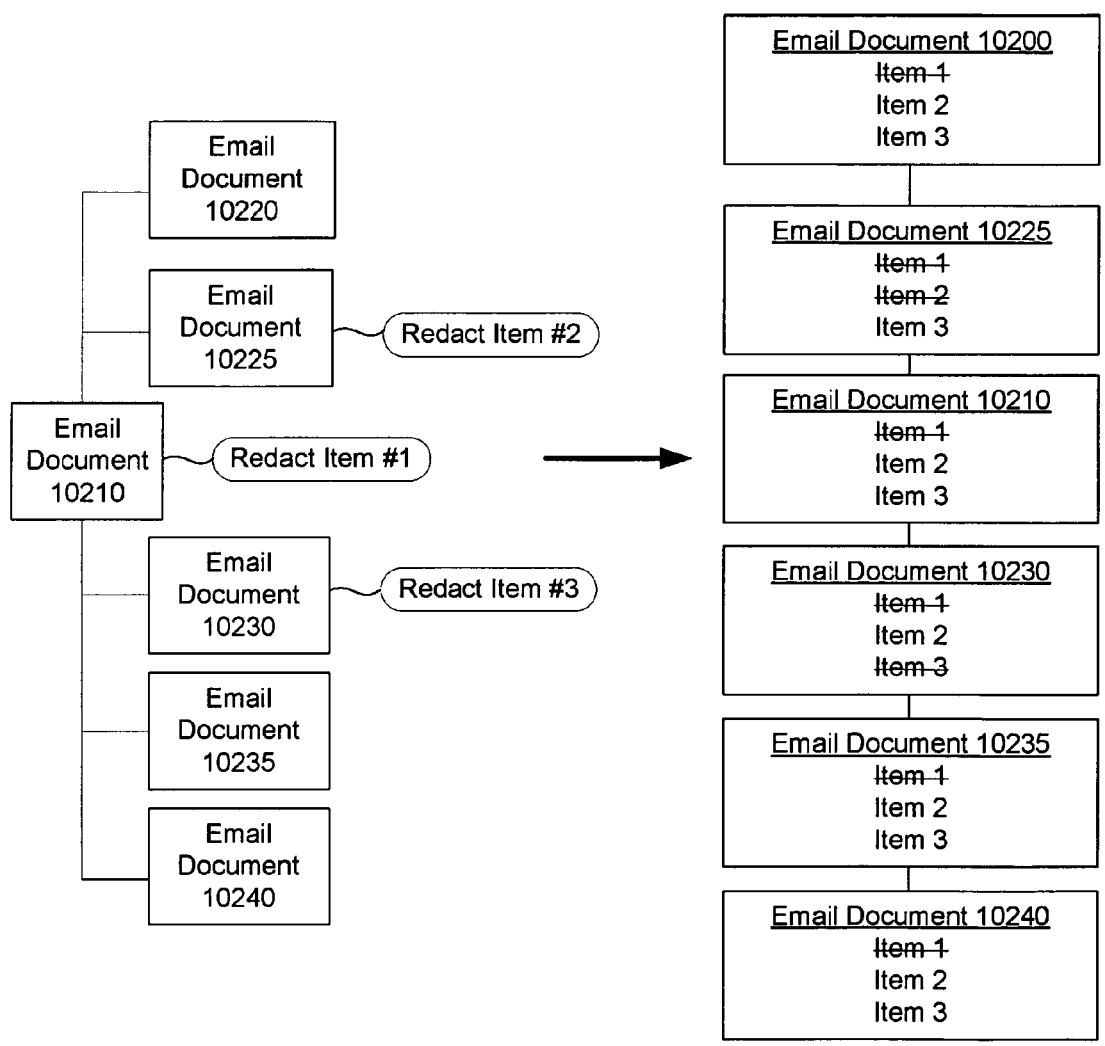
FIG. 10C is an illustration showing the propagation of redacting content according to an embodiment.

FIG. 10C is an illustration showing the propagation of redacting content according to an embodiment. A review content specifying redacting of item #1 is associated with an email document 10210; a review data #2 specifying redacting of item #2 is associated with email document 10225; and a review data #3 specifying redacting of item #3 is associated with email document 10230. According to the embodiment, upon propagation, information specifying redaction of item #1 is propagated to the rest of the related set of documents—specifically, email documents 10220, 10225, 10230, 10235, and 10240. Neither redaction of item #2 nor redaction of item #3 are specified to be propagated. Accordingly, redaction of item #2 and information specifying redaction of item #3 are limited only to documents 10225 and 10230.

As shown on the right side of FIG. 10C, which depicts a result of a propagation process: item #1 in all email documents in a group or thread is redacted since information instruction item #1 to be redacted is specified to be propagated to all related documents. Item #2 is redacted only in document 10225 because item #2 is specified to be redacted in document 10225 and not to be propagated to any other of the related documents. Item #3 is redacted only in document 10230 since information instructing item #3 to be redacted is specified to be associated only with document 10230 and not to be propagated to any other of the related documents.

Figure 10D:
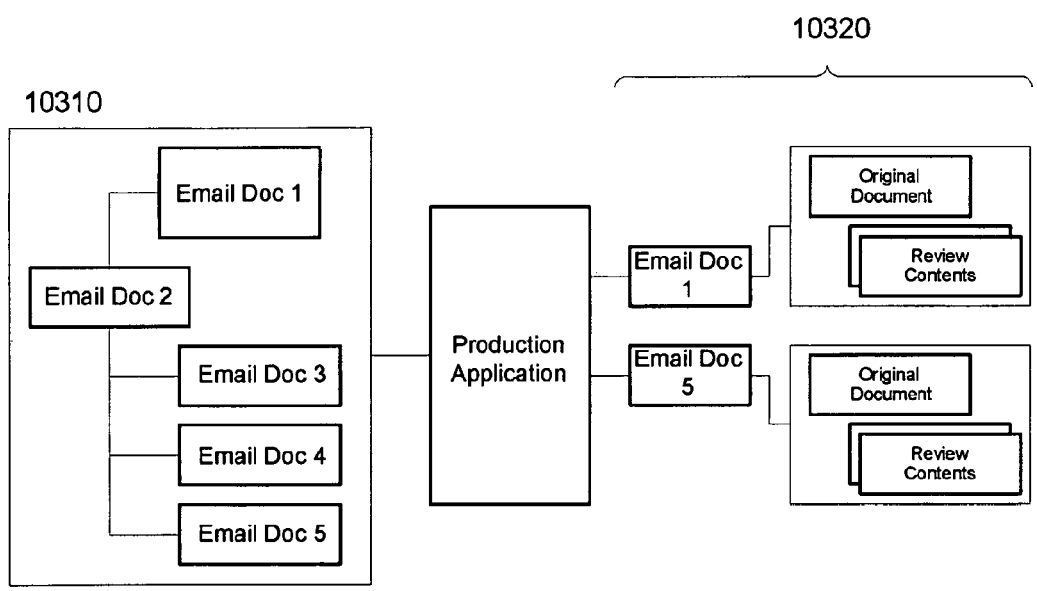
FIG. 10D is a simplified illustration showing an embodiment of techniques for propagating review content to email documents for production.

FIG. 10D is a simplified illustration showing an embodiment of techniques for propagating review content to email documents for production. A group of email documents 10310 includes, in this example, five email documents, labeled email documents 1-5. A reviewer processes these documents and concludes that only two of the email documents, specifically email document 1 and email document 5, are relevant. Consequently as shown on the right side of the figure, only two email documents, documents 1 and 5, are eventually produced (produced email documents 10320).

In the embodiment, produced email documents 10320 are associated with information relating to the original document as well as information relating to review content. When a court reviews email document 1 or 5 and questions its authenticity, for example, the information relating to the original document can be used to track and obtain the original document. When a court or opposing party reviews the produced documents—including email document 1 or 5—the document will be marked up and/or annotated in accordance with all review contents associated with the email document, according to the embodiment.

In general, depending on the embodiment, the email documents that are produced to an opposing party can appear in a number of formats. According to an embodiment, the produced documents can presented in pdf format. The produced documents can also be presented in native format including word and excel formats. According to an embodiment, review content such as tag information can be adapted to categorize the produced documents. The email documents can be organized and accessed through a tree format in accordance with tag information. The produced documents are also rendered to be efficiently searchable in accordance with information contained in the tag information Depending on the embodiment, in the production documents, comments and annotations may appear to a margin with tracing marks and labels to the main contents as appropriate. Redacted sections can appear as sections with black mark covering up sections that have been marked for redaction.

Depending on the embodiment, review information such as comments, annotations, and tags can be stored on a xml file relating the appropriate files and the review information. Redaction, according to an embodiment, is built into the generation of the pdfs. To maintain and provide ability to prove and trace integrity and authenticity of documents, data can be collected and preserved in the original native form and references to locations where the documents are originally found are preserved throughout the process.

Depending on the embodiments, both content data as well as meta-data for the contents, such as the owner, last access time, last modified time and external name of the content data, are collected and preserved and produced with the final set of production documents. The final production documents can be stored in a disc such as a DVD disc or be transmitted electronically.

Figure 11A:
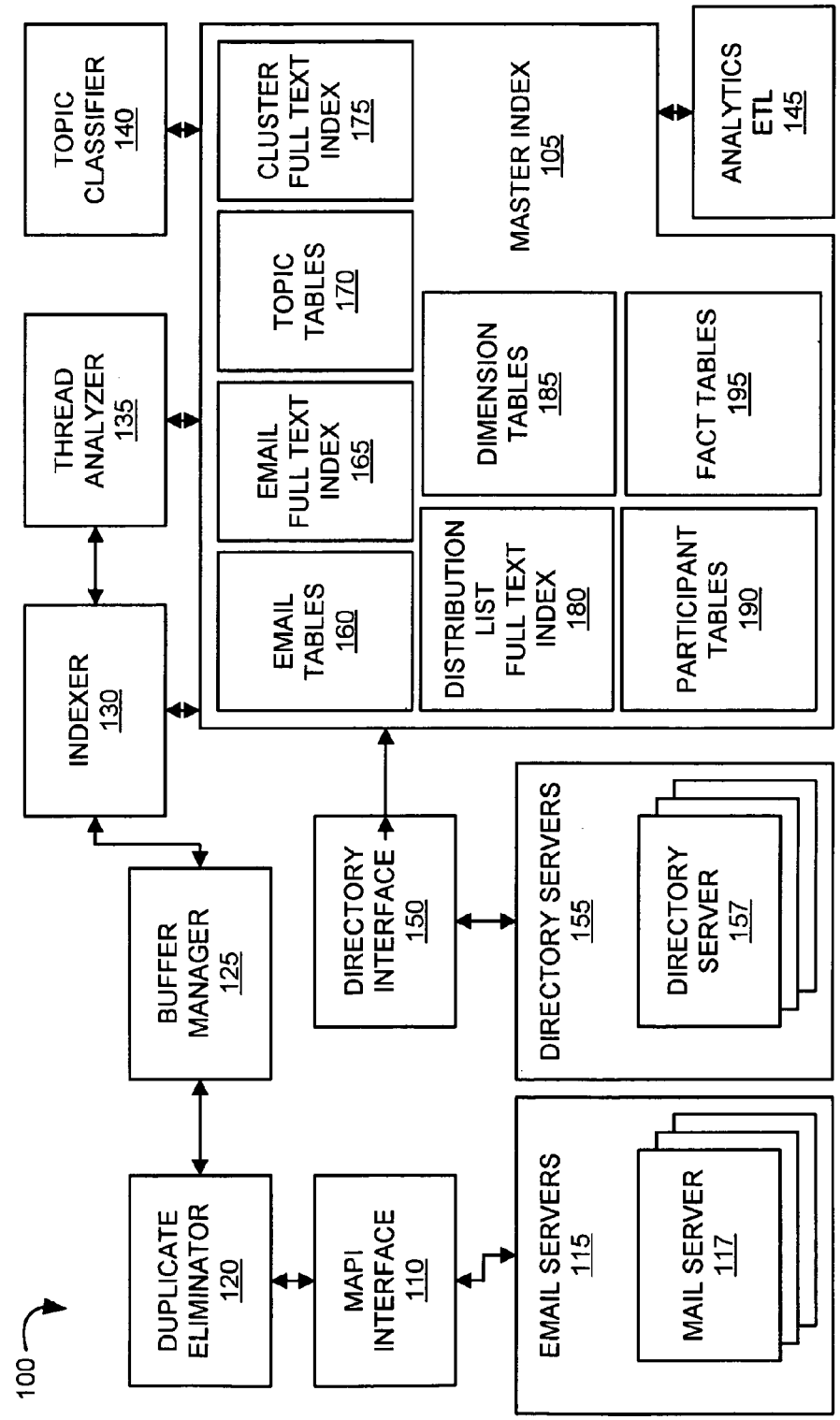
FIG. 11A is a block diagram of an electronic message processing system in one embodiment according to the present invention.

FIG. 11A is a block diagram of an electronic message processing system 100 in one embodiment according to the present invention. Electronic message processing system 100 includes master index 105, messaging applications programming interface (MAPI) module 110, email servers 115, duplicate eliminator 120, buffer manager 125, indexer 130, thread analyzer 135, topic classifier 140, analytics extraction, transformation, and loading (ETL) module 145, directory interface 150, and directory servers 155. Master index 105 includes email tables 160, email full text index 165, topic tables 170, cluster full text index 175, distribution list full text index 180, dimension tables 185, participant tables 190, and fact tables 195. Email servers 115 include one or more mail servers 117. Directory servers 155 include one or more directory servers 157.

Master index 105 includes hardware and/or software elements that provide storage and retrieval of information associated with electronic messages, such as email, instant messaging (IM) messages, Short Message Service (SMS) messages, Multimedia Message Service (MMS), and the like. Some examples of master index 105 are flat files, databases, data marts, data warehouses, and other repositories of data. Although the disclosure references electronic messages as email messages, the disclosure should not be considered as limited to only email message formats. The disclosure may also apply to other types of electronic messages, such as IM, SMS, MMC messages, and the like.

In various embodiments, email tables 160 store information associated with email messages processed by the system 100. Email full text index 165 stores an inverted index that enables fast searching of contents (e.g., headers and body), metadata, and attachments of email messages processed by the system 100. Topic tables 170 store relationships between categories or topics and email messages processed by the system 100. Cluster full text index 175 stores an index of email messages that have a close relationship, such as relationships based on statistical analysis of noun phrases, and the like. The email messages having close relationships are then associated with topics in the topic tables 170. Distribution list full text index 180 stores the full text of email messages associated with a distribution or mailing list. Participant tables 190 store information related to participants of a distribution or mailing list (e.g., To-recipients, CC-recipients, BCC-recipients, etc.). Dimension tables 185 and fact tables 195 store information related to data warehouse processing of email messages.

MAPI module 110 is linked to the email servers 115 and to the duplicate eliminator 120. In this example, the email servers 115 include one or more mail servers 117. MAPI module 110 includes hardware and/or software elements that communicate with the email servers 115. Email servers 115 include hardware and/or software elements that provide electronic messaging services, such as email transport, storage, and retrieval. One example of the mail servers 117 is a computer system running Microsoft Exchange Server 2000 from Microsoft Corporation of Redmond, Wash. In other examples, the email servers 117 may include operating systems, such as Microsoft Windows 2000/XP/2003, UNIX, and Linux, and mail transport agents, mail user agents, and the like. Email messages may be stored on the mail servers 117 in a file, such as an Outlook PST file, and the like.

Duplicate eliminator 120 includes hardware and/or software elements that detect and eliminate redundant and/or duplicative information retrieved by the MAPI module 110. Buffer manager 125 is linked to the duplicate eliminator 120 and the indexer 130. Buffer manager 125 includes hardware and/or software elements that manage data communications between the duplicate eliminator 120 and the indexer 130.

Indexer 130 is linked to the master index 105. Indexer 130 includes hardware and/or software elements that process electronic messages to determine message content and generate metadata associated with the electronic messages. For example, the index 130 may process an email message to parse header and body fields to retrieve message content and generate metadata associated with the email message.

Thread analyzer 135 is linked to the indexer 130 and the master index 105. Thread analyzer 135 includes hardware and/or software elements that organize email messages into one or more email threads. An email thread is a series or sequence of one or more email messages that form a logical "discussion" or "communication." Some examples of email messages within an email thread are email messages related by sender address, recipient address, topic, and time. Another example of email messages within an email thread are email messages with forwarding replies, CC-recipients, BCC-recipients, and the like. In this example, the thread analyzer 135 determines the position of an email message in an email thread in response to message content and metadata of the email message.

Topic classifier 140 is linked to the master index 105. Topic classifier 140 includes hardware and/or software elements that determine one or more topics or categories in response to email message content and metadata. The topic classifier 140 may determine the topic of an email message based on the subject header or in response to the content of the body of an email message. The topic classifier 140 may also associate an email message with a given topic, classifier, and/or category.

Analytics ETL module 145 is linked to the master index 105. Analytics ETL module 145 includes hardware and/or software elements that provide an interface accessing content and metadata processed by the system 100. In one example, the analytics ETL module 145 provides an interface for extracting data from the master index 105 and/or external data sources; an interface for transforming the data, which includes cleansing, aggregation, summarization, integration, as well as basic transformation; and an interface for loading the data into some form of data warehouse for further analysis and processing.

Directory interface 150 is linked to the master index 105 and the directory servers 155. Directory interface 150 includes hardware and/or software elements that access information stored in a directory. A directory is any database of information associated with objects, such as users or computer hosts. In various embodiments, the directory servers 155 include one or more directory servers 157 running Active Directory by Microsoft Corporation of Redmond, Wash. In other embodiments, other types of directory servers and/or services may be used such as Lightweight Directory Access Protocol (LDAP) servers, Identity Management servers, and the like. In various embodiments, examples of information stored in the directory servers 155 include "organizational" or "corporate" data, such as department identifiers associated with a user or computer host, a group identifier associated with a user, a corporate or departmental title associated with a user, telephone and address information, and security information.

In operation of the electronic message processing system 100, the MAPI module 110 retrieves email messages from the email servers 115 (e.g., from one of the mail servers 117). For example, the system 100 may "crawl" the email servers 115 requesting email messages through the MAPI module 110. The duplicate eliminator 120 filters redundant and/or duplicate email messages received from the email servers 115.

The indexer 130 receives the email messages from the duplicate eliminator 120 through the buffer manager 125. The indexer 130 processes the email messages to determine the contents of the email messages and metadata associated with each email message. The indexer 130 stores a full text index of the email messages and the metadata in the master index 105. For example, the indexer 130 stores sender and recipient information associated with an email message in the email tables 160; the indexer 130 stores an inverted word list of the full text of the email message in the email full text index 165; etc.

The thread analyzer 135 processes the contents of the email messages and the metadata in the master index 105 to organize the email messages into email threads. In general, the thread analyzer 135 organizes the email messages into email threads that form a discussion or communication of a topic or concept. One example of operation of the thread analyzer 135 is described below with respect to FIGS. 9, 10A, and 10B. The topic classifier 140 processes the contents of the email messages and the metadata in the master index 105 to determine topics or categories associated with the email messages. The topic classifier 140 stores the categories or topics in the topics tables 170, and stores a full text index of email messages belonging to and/or associated with the same topic in the cluster full text index 175.

The directory interface 150 retrieves directory or organizational information from the directory servers 155 (e.g., from one of the directory servers 157) related to the email messages. The indexer 130 or the thread analyzer 135 may use the organizational information during, processing, indexing, and/or threading of the email message. In this example, the organizational data is stored in the participant tables 190 and the distribution list full text 180.

A user or computer process connects to the analytics ETL module 145 to retrieve information associated with the email messages processed by the system 100. Advantageously, the electronic message processing system 100 provides a user or organization with access to email messages, and other information, such as header information, message contents, message attributes, metadata, and the like, to assist in reporting requirements or gathering information for the purposes of electronic discovery. After "crawling" email repositories (e.g., one of the mail servers 117) to retrieve email messages, the system 100 processes and indexes the retrieved email messages and stores metadata related to the processed email messages in the master index 105. The system 100 allows the user or organization to search and query the processed email messages and the metadata to quickly extract and process relevant information. The system 100 further provides threading and topic classification of email messages to enhance the discovery and presentation of relevant information to the user or organization.

In various embodiments, after an initial crawl of a data or email repository, such as the email servers 115, the system 100 may incrementally process newly arriving email messages on a daily bases, an hourly basis, or the like. As described above, the new email messages may be incorporated into the master index 105.

Figure 11B:
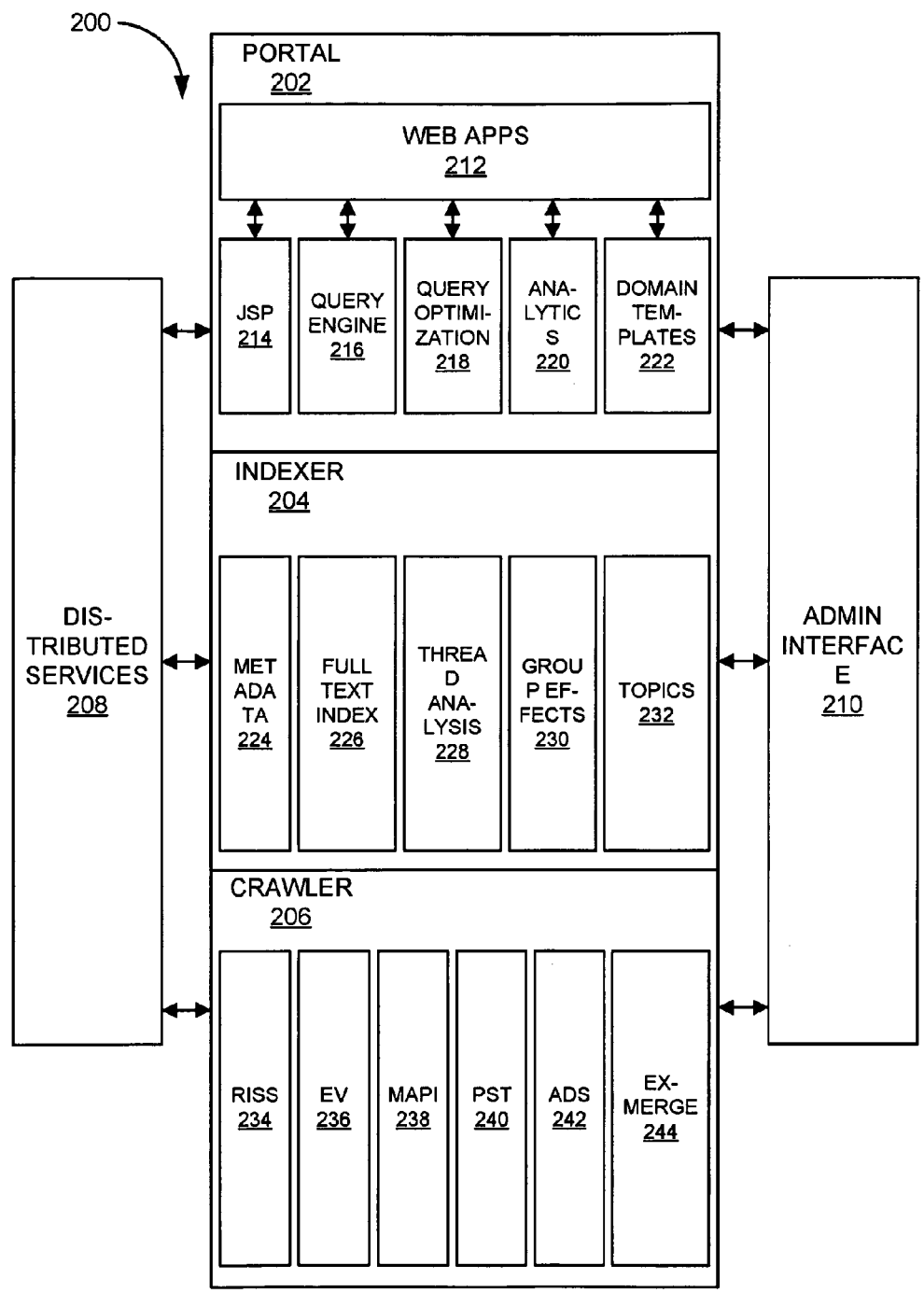
FIG. 11B is a block diagram of software components for processing email messages in one embodiment according to the present invention.

FIG. 11B is a block diagram of software components 200 for processing email messages in one embodiment according to the present invention. Software components 200 include portal 202, indexer 204, crawler 206, distributed services 208, and administration interface 210. Portal 202 is linked to the indexer 204, which is linked to the crawler 206. Distributed services 208 and administration interface 210 are linked to each of the portal 202, the indexer 204, and the crawler 206.

Portal 202 includes software elements for accessing and presenting information provided by the indexer 204. In this example, the portal 202 includes web applications 212 communicatively coupled to information gathering and presentation resources, such as a Java Server Page (JSP) module 214, a query engine 216, a query optimization module 218, an analytics module 220, and a domain templates module 222.

Indexer 204 includes software elements for processing and storing email messages. The indexer 204 includes metadata 224, full text indices 226, thread analysis 228, group effects 230, and topics 232.

Crawler 206 includes software elements for retrieving email messages from an email repository. Some examples of an email repository are an email server (e.g., one of the mail servers 117 of FIG. 11A), a Post Office Protocol (POP) enabled computer server, an Internet Message Access Protocol (IMAP) enabled computer server, and files, such as PST files, UNIX style maildirs/mbox formats, and the like. In this example, the crawler 206 includes Reference Information Storage System (RISS) module 234, Enterprise Vault Software (EV) module 236, MAPI module 238, PST module 240, Directory Services (ADS) module 242, and a Microsoft Exchange Server Mailbox Merge Wizard (ExMerge) module 244.

Figure 11C:
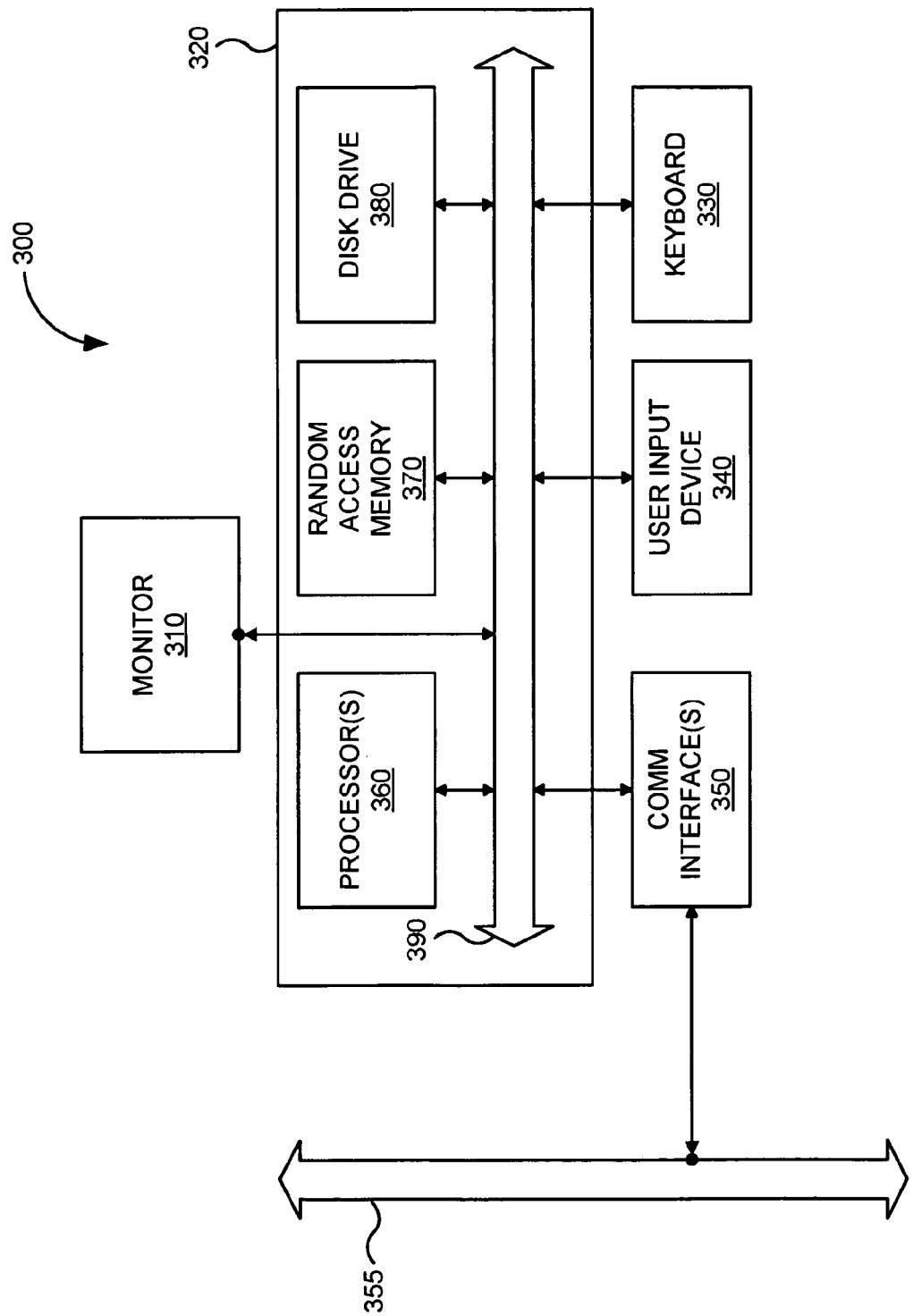
FIG. 11C is a block diagram of a computer system in one embodiment according to the present invention.

FIG. 11C is a block diagram of a computer system 300 in one embodiment according to the present invention. In this example, computer system 300 includes a monitor 310, computer 320, a keyboard 330, a user input device 340, one or more computer interfaces 350, and the like. In the present embodiment, the user input device 340 is typically embodied as a computer mouse, a trackball, a track pad, a joystick, wireless remote, drawing tablet, voice command system, eye tracking system, and the like. The user input device 340 typically allows a user to select objects, icons, text and the like that appear on the monitor 310 via a command such as a click of a button or the like.

Embodiments of the computer interfaces 350 typically include an Ethernet card, a modem (telephone, satellite, cable, ISDN), (asynchronous) digital subscriber line (DSL) unit, FireWire interface, USB interface, and the like. For example, the computer interfaces 350 may be coupled to a computer network 355, to a FireWire bus, or the like. In other embodiments, the computer interfaces 350 may be physically integrated on the motherboard of the computer 320, may be a software program, such as soft DSL, or the like.

In various embodiments, the computer 320 typically includes familiar computer components such as a processor 360, and memory storage devices, such as a random access memory (RAM) 370, disk drives 380, and system bus 390 interconnecting the above components.

The RAM 370 and disk drive 380 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

In operation, computer system 300 receives electronic messages, such as email messages, from electronic messaging repositories. Computer system 300 processes an email message to determine message attribute data associated with the email messages. Message attribute data is information related to an attribute or content of an electronic message. Some examples of message attribute data are sender email address or sender identifiers, recipient identifiers, names associated with sender/recipient identifiers, attachment data, in-line text, body content, routing information, header information, and the like. The message attribute data allows computer system 300 to provide users and organizations with access to message content, relationships between email messages, topics, rankings, and the like.

Figure 11D:
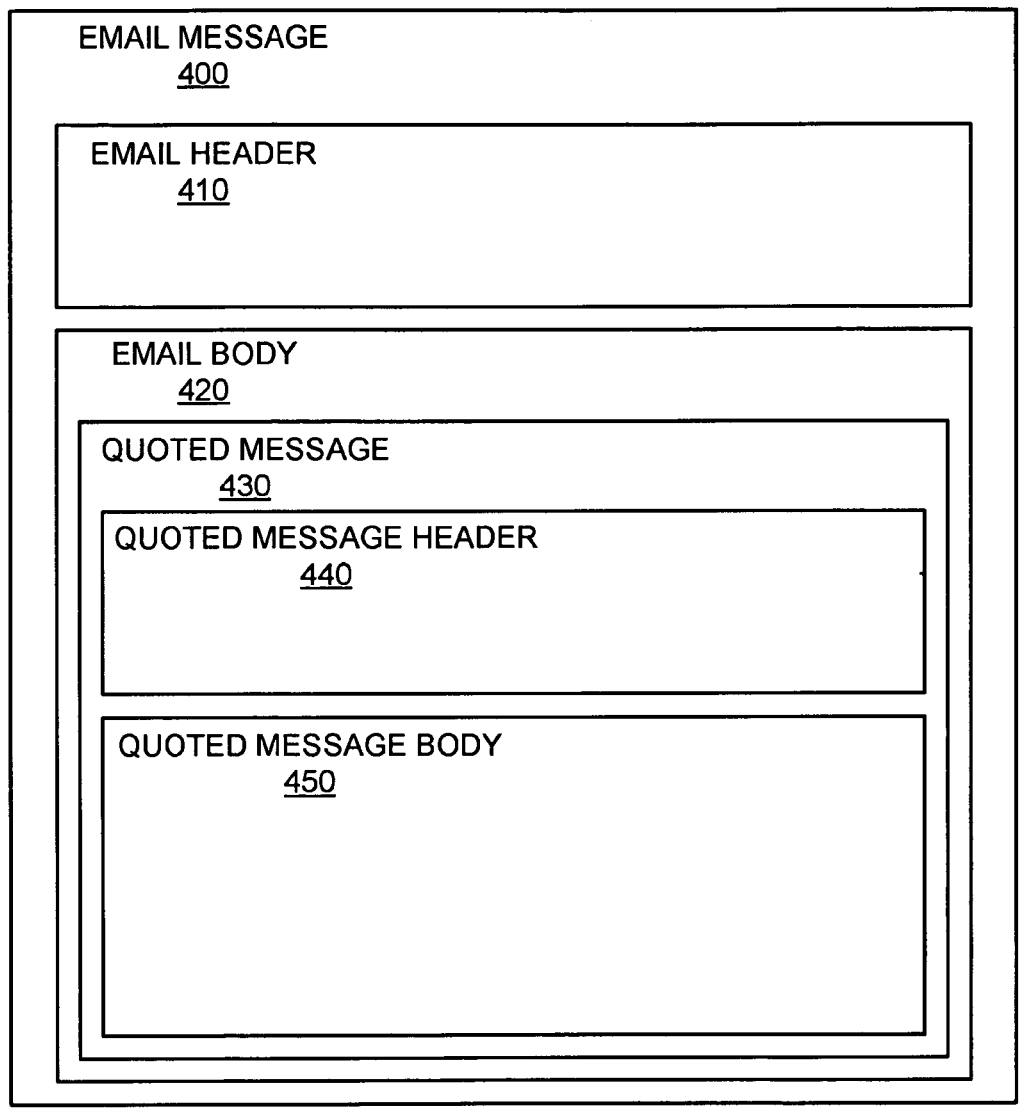
FIG. 11D is a block diagram of an exemplary email message.

FIG. 11D is a block diagram of an exemplary email message 400. The email message 400 can be any message transmitted over a communications network, such as the Internet. In one example, the email message 400 is a message communicated using one of the protocols adapted for communication using the Transport Control Protocol/Internet Protocol (TCP/IP) suite of protocols used over the Internet, such as the Simple Mail Transfer Protocol (SMTP). The email message 400 may be communicated by using dedicated messaging client, such as Outlook and the like, and a web browser, such as Mozilla Firefox and Microsoft Internet Explorer and the like using a web-mail interface.

Email message 400 includes email header 410 and email body 420. In this example, email header 410 generally includes message attribute data related to header information, such as routing information, spam/virus scanning information, a subject, a sender identifier (e.g., the originating or sending email address), one or more recipient identifiers (e.g., To-recipients, CC-recipients, and BCC-recipients, and distribution list email addresses), priority, and the like. As the email message 400 travels to its destination, information about the path or network hosts through which the email message 400 passed may be appended to the email header 410 in the routing information.

Email header 410 may also contain information about the email client from which the email message 400 was sent. Additionally, the email header 410 may include information related to the format or encoding used to communicate the email body 420.

The email message 400 is typically encoded in ASCII (American Standard Code for Information Interchange) text. The email message 400 includes message attribute data related to portions (e.g., headers, body, etc.) of the email message 400. In various embodiments, the email body 420 includes non-text data, such as graphic images and sound files and the like, in-line with text and as attachments. Some examples of the contents of the email body 420 are plain text, base-64 encoded text, an encoded binary file, a portion of an email message, an attached Portable Document Format (PDF) file, an attached or in-line Microsoft Word document file, and the like.

In various embodiments, email body 420 of the email message 400 also includes a quoted message 430. The quoted message 430 itself includes quoted message header 440 and quoted message body 450. In general, quoted message 430 is a portion of an email message or an entire email message. Portions of email messages are often included in-line with other text in the email body 420. For example, the email message 400 may be a reply to an initial or earlier email message that is included in the email body 420 as the quoted message 430. Entire or complete email messages are often included in-line or as an attachment to the email message 400. In other embodiments, quoted message 430 may be a forwarded messages, etc.

Quoted message header 430 comprises information, such as sender and recipient identifiers, much like the email header 410. Often, the quoted message header 430 includes at least a sender identifier, one or more recipient identifiers, a subject, a timestamp, and the like. Quoted message body 450 may be plain text, html, encoded text, and the like. The quoted text body 450 also may include portions of other email messages and attachments.

Figure 11E:
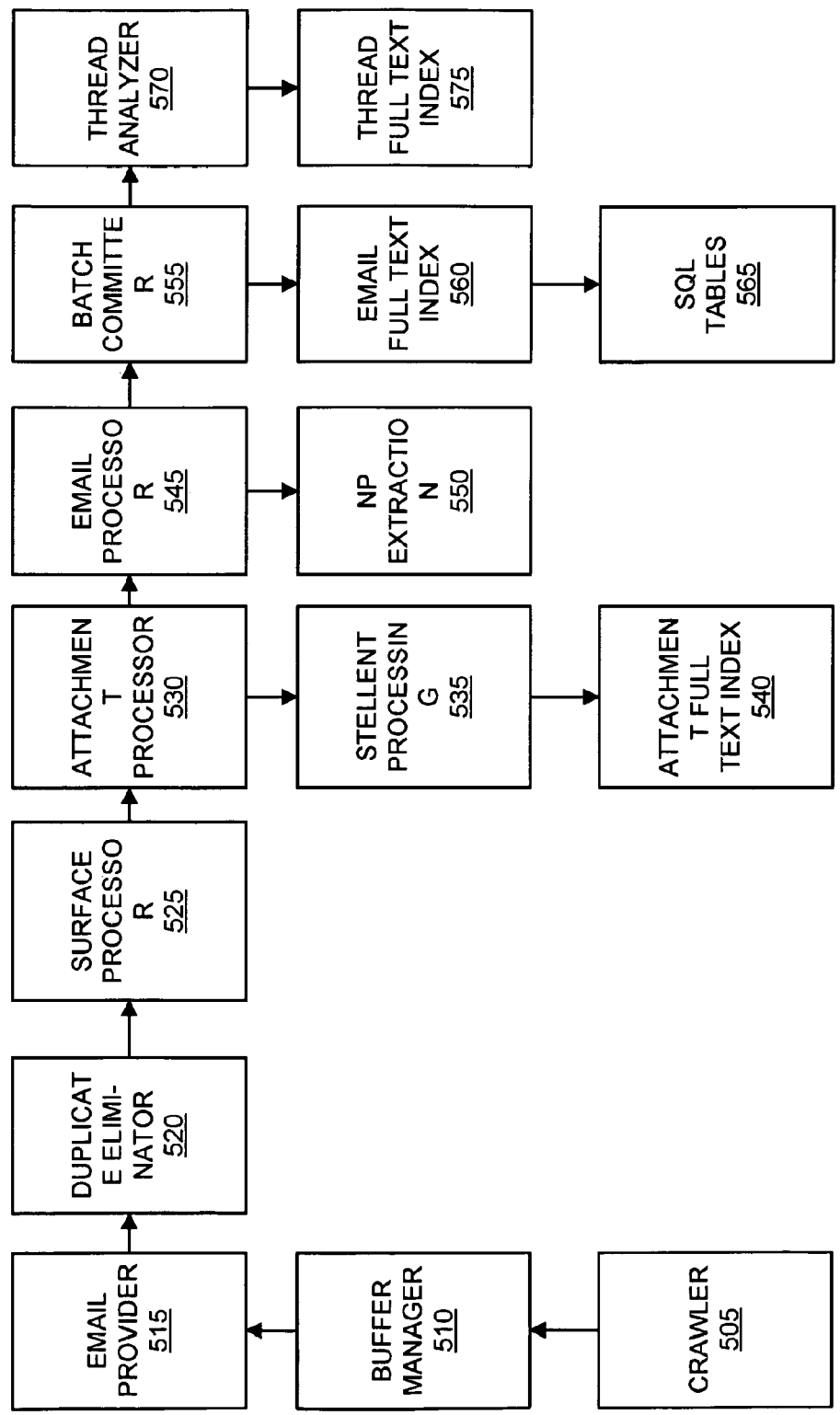
FIG. 11E is a block diagram illustrating an exemplary processing flow of electronic messages in one embodiment according to the present invention.

FIG. 11E is a block diagram illustrating an exemplary processing flow of electronic messages in one embodiment according to the present invention. In crawler box 505, computer system 300 retrieves email messages from email repositories, such as an email server or a file containing email messages, and sends the email messages to a buffer manager. In buffer manager box 510, computer system 300 buffers or otherwise manages production and consumption of the email messages retrieved while computer system 300 is "crawling" the email repositories. In email provider box 515, computer system 300 creates batches of email messages. In this example, batching the email messages allows computer system 300 to apply batch-processing techniques to message attribute data associated with a batch of email messages. For example, computer system 300 may create batches of 10, 50, or 100 email messages.

In duplicate eliminator box 520, computer system 300 processes the email messages in the email message batches to determine duplicates or redundant email messages. For example, a user A of the mail server 117 (FIG. 11A) may have sent an email message addressed to user B and to user C. When computer system 300 retrieves email messages from mailboxes on the mail server 117 for users A, B, and C, user A's mailbox contains the email message as sent to user B and user C. Additionally, both user B's and user C's mailbox contains the respective user's copy of the email message as received from user A. In this example, computer system 300 receives possibly three copies of the email message in the duplicate eliminator box 520.

Computer system 300 determines which of the three copies of the email message to further process. In one example, computer system 300 determines two MD5 checksums for each email message to "identify" an email message. A first strict MD5 checksum is computed to be unique and represents an exact match of a previously processed email message. A second "relaxed" MD5 checksum is computer to be non-unique or semi-unique.

When computer system 300 receives a new email, computer system 300 processes the new email message (e.g., address normalization and cleansing) and computes a strict MD5 checksum for the new email message and compares the strict MD5 checksum to previously computed strict MD5 checksums to determine whether the new email message is unique. In one example of operation, computer system 300 computes the strict MD5 checksum in response to message attribute data associated with an email message using the sender email address or sender identifier, sorted To-recipient email addresses or To-recipient identifiers, sent time, alphanumeric contents of subject, and the body text (e.g., body text size, contents of the body text, etc.).

Computer system 300 then computes a relaxed MD5 checksum using a portion of the message attribute data used to compute the strict MD5 checksum. Other information not included in the email message but associated with the message attribute data may be used to compute the strict and relaxed MD5 checksums. Other types of integrity, detection, and authenticity algorithms, such as cyclical redundancy checks (CRCs), hashes, and the like, may be used in addition to or in the alternative to the MD5 checksum.

In this example, if the strict MD5 checksum for the new email message is different, computer system 300 computes a relaxed MD5 checksum for the new email message and compares the relaxed MD5 checksum to previously computed relaxed MD5 checksums. If the relaxed MD5 checksum for the new email message is different, then the new-email address is not a duplicate. If the relaxed MD5 checksum for the new email message is the same as one or more previously computed relaxed MD5 checksums, computer system 300 applies rules or policies to eliminate possible duplicate email messages that may occur due to time differences, header processing, and the like, and also the addition of trailing content, such as disclaimers, names of attachment files, and the like.

In surface processor box 525, computer system 300 processes the email messages (e.g., to populate the master index 105 of FIG. 11A with information related to the message attribute data). Some examples of surface processing are whether text in a body of an email message is text included in another email message (e.g., as a response to the email message), identity information of senders, and identity information of recipients. In attachment processor box 530, computer system 300 processes the email message for attachments. If an email message includes an attachment, computer system 300 further processes the attachment in Stellent processing box 535. In this example, computer system 300 processes the attachment according to content management and searching solutions from Stellent, Inc. of Eden Prairie, Minn. In attachment full text index box 540, computer system 300 stores an inverted index of the extracted text of an attachment, if any (e.g., in the master index 105).

In email processing box 545, after attachment processing or if no attachment exists in an email message, computer system 300 operates on the batch of email messages to parse or extract further information associated with message attribute data from the email messages. In NP extraction box 550, for example, computer system 300 processes subject and body content of the email messages, such as to extract noun phrases, and the like. Computer system 300 then normalizes the extracted noun phrases into a feature vector that represents topical information associated with the email messages.

In batch committer box 555, computer system 300 commits the processed email messages in the batch to storage. In one example, computer system 300 populates the master index 105 with information parsed or indexed in the email processor box 545. In email full text index box 560 of this example, computer system 300 stores a full text index of the email messages (e.g., in the email full text index 165 of FIG. 11A). In SQL tables box 565, computer system 300 prepares Structured Query Language (SQL) tables allowing the email messages and message attribute data associated with the email messages in the batch to be searched using SQL statements.

In thread analyzer box 570, computer system 300 processes the email messages to determine email threads in response to message attribute data of the email messages. In thread full text index box 575, computer system 300 stores a full text index of email threads (e.g., in the master index 105). Further operations of computer system 300 in the thread analyzer box 570 are described further with respect to FIGS. 8A, 8B, 9, 10A, and 10B.

Figure 11F:
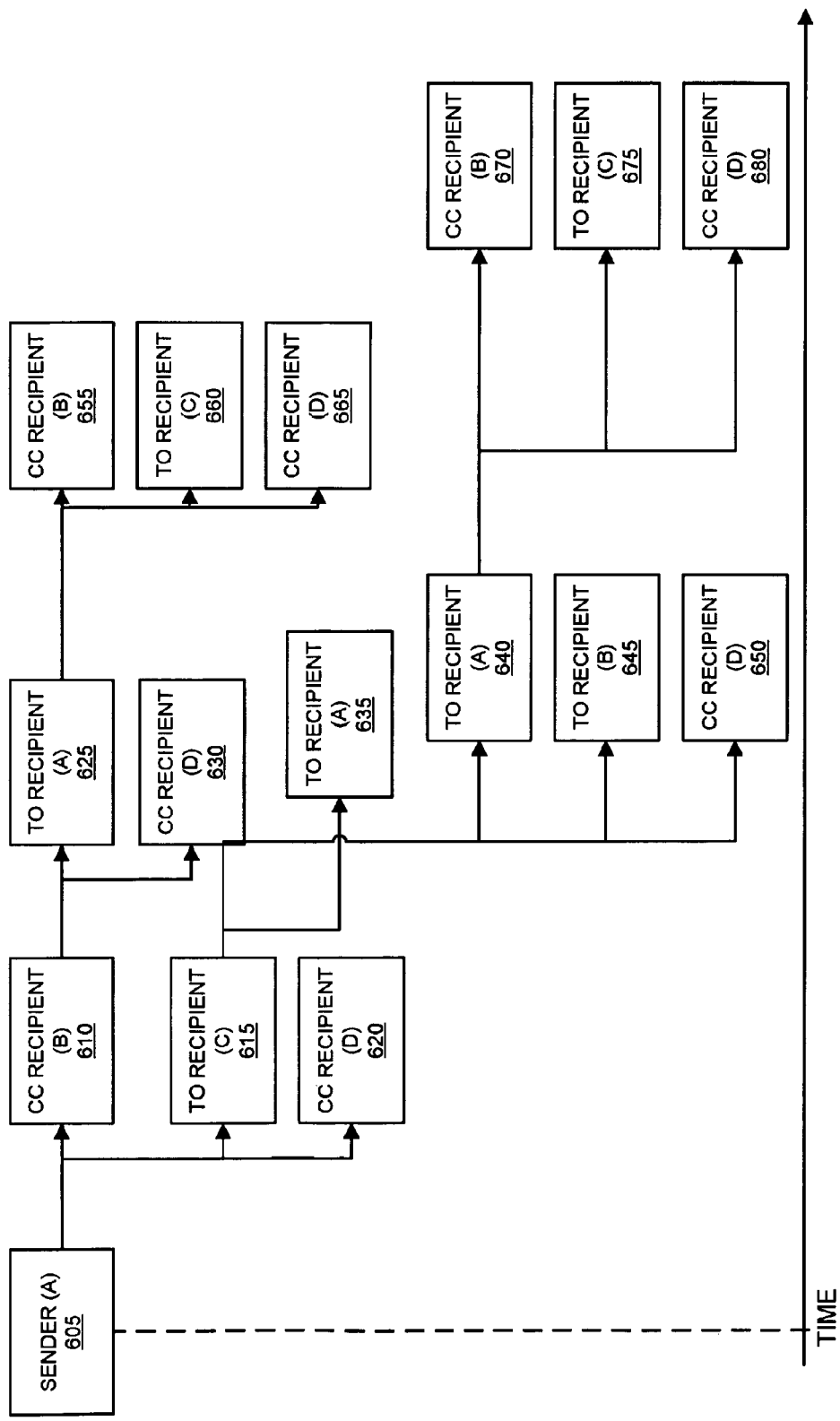
FIG. 11F is a block diagram illustrating an exemplary message sequence chart related to an email thread.

FIG. 11F is a block diagram illustrating an exemplary message sequence chart related to an email thread. An email thread is a series or sequence of one or more email messages that form a logical "discussion" or "communication." Email messages can be related by thread criteria, such as time, sender, topic, etc. An email thread also can provide an indication of user interactions to an earlier or original email message that initiated a discussion or communication formed by a series of email messages. Typically, the email that initiated the subsequent user interactions or communications is called a thread origin (e.g., email message 605).

Referring to FIG. 11F, a thread criterion defines an initial time starting indicative of when an email message 605 was sent. As a result, the email thread includes email messages, transmitted during a time interval, that satisfy another thread criterion. In this example, computer system 300 determines email messages that satisfy the thread criterion are email messages related to the email message 605 or otherwise transmitted in response to the email message 605.

In this example, user (Sender) A composes email message 605 to three users. The email message 605 may be considered the origin of the email thread illustrated in FIG. 11F. User B receives email message 610 as a carbon copy (CC) recipient. User C receives email message 615 as a To-recipient. User D receives an email message 620 as a CC-recipient.

In response to the email message 610, the user B composes an e-message to users A and D. The user A receives email message 625 as a To-recipient, and the user D receives email message 630 as a CC-recipient. The user B may have forwarded or replied to the email message 610 such that the email messages 625 and 630 included the body text of the email message 610 (in other words the original email message 605). The email messages 625 and 630 may also include the email message 610 as an attachment, and include a similar subject as the email message 610.

Next in the email thread of FIG. 11F, in response to the email message 615, the user C composes an email message to user A. The user A receives email message 635 as a To-recipient. Subsequently, again in response to the email message 615, the user C composes an email to users A, B, and D. The user A receives email message 640 as a To-recipient. The user B receives email message 645 as a To-recipient. The user D receives email message 650 as a CC-recipient.

After receiving the email message 640, the user A composes an email message to users B, C, and D in response to the email message 625. The user B receives email message 655 as a CC-recipient. The user C receives email message 660 as a To-recipient. The user D receives email message 665 as a CC-recipient.

Subsequently, in response to the email message 640, the user A composes an email message to users B, C, and D. The user B receives email message 670 as a CC-recipient. The user C receives email message 675 as a To-recipient. The user D receives email message 680 as a CC-recipient.

Advantageously, computer system 300 allows a user or organization to discover information in email messages that relates to discussions or communications about specific topics. Computer system 300 organizes the information, such as email messages, into a thread and generates one or more topics in response to message attribute data associated with email messages. Computer system 300 allows the user or organization to analyze the information to drive better business performance and/or comply with regulatory requirements.

Furthermore, computer system 300 allows the users and organizations to analyze properties of email (such as recipients, replies, forwards, subject header, etc.), and combine the properties with organizational or corporate data to derive discussions and communication patterns within an organization or corporation. Computer system 300 provides access to electronic messages and message attribute data associated with the electronic messages. This allows users and organizations to quickly extract, analyze, and report information.

As a result of user interactions in response to an email message, subsequent email messages may include quoted text from prior email messages or include prior email messages as attachments. Computer system 300 (FIG. 11C) allows users or organizations to retrieve transactional email messages from local email repositories. Transactional email messages are electronic messages that are received from and/or stored on an email server or in a file (e.g., one of the mail servers 117 of FIG. 11A). A transactional message may include quoted text or attachments.

In various embodiments, computer system 300 processes the transactional email messages to determine derived email messages. Derived email messages are electronic messages sent by electronic messaging services, where the electronic messages are included within other electronic messages. As described with respect to FIG. 11D, some examples of derived email messages are quoted text in forwarded or replied to email messages, and email messages included as attachments. For example, a transactional email message may include a derived email message. A benefit provided by various embodiments is that computer system 300 allows users and organizations to capture information in derived email messages that otherwise may not have been retrieved from the local email repositories as transactional email messages.

As the use of electronic messaging proliferates, emails are often received from outside of organizations that initiate discussions or communications within the organization. Computer system 300 provides the users or organizations the ability to determine from derived email messages whether discussions or communication originated from outside the organization. Additionally, computer system 300 allows the users or organizations to track whether topic discussion left or went outside the organization during a series of email messages and later returned to an internal discussion within the organization.

In general, a system for processing email messages (e.g., computer system 300 of FIG. 11C) includes a processor and a communications interface. The communications interface receives, from an email repository, a transactional email message comprising message attribute data. The processor is coupled to the communications interface. As described above, the processor places the transactional email message in an email thread in response to the message attribute data of the transaction email message. The processor then determines whether there is a derived email message included in the transactional email message. For example, if a derived email messages such as a reply or forwarded message, is included in the transactional email message, the processor determines derived message attribute data of the derived email message. The processor then places the derived email message in the email thread in response to the derived message attribute data of the derived email message.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method comprising:
  combining, by a processor, a plurality of electronically stored documents into a plurality of groups, wherein each group comprises a plurality of related documents, and wherein for each of the plurality of electronically stored documents the combining comprises:
    comparing a feature vector of the electronically stored document to a set of potential categories, wherein the feature vector comprises one or more feature vector words of the electronically stored document,
    determining a subset of the potential categories based on a relevance score between the electronically stored document and a first category within the subset of the potential categories exceeds a first threshold, and
    assigning the electronically stored document to a second category within the subset of the potential categories based on a similarity distance between the feature vector of the electronically stored document and a feature vector of the second category exceeds a second threshold;
  receiving, by the processor, review content provided by a user for a group of the plurality of groups;
  associating the review content with the group; and
  propagating the review content based on propagation information indicating documents in the group to which to propagate the review content based on a review of at least one of the related documents, wherein propagating the review content based on the propagation information comprises at least one of propagating the review content to each of the plurality of related documents or propagating the review content to a subset of the plurality of related documents, wherein the review content comprises redaction information to redact a portion of each of the plurality of related documents or to redact a portion of each document of the subset of the plurality of related documents, and wherein the redaction information specifies one or more locations corresponding to line numbers of each of the plurality of related documents or each document of the subset of the plurality of related documents that are not displayed in response to a query returning the documents.

2. The method of claim 1, wherein the plurality of related documents for a group are at least one of duplicates or near duplicates of each other.

3. The method of claim 1, wherein the review content is indicative of textual information or an annotation.

4. The method of claim 1, further comprising:
  receiving another review content for the group; and
  generating a final version of each related document in the plurality of related documents in the group, wherein the final version includes the review content and the additional review content.

5. The method of claim 1, wherein the review content is created and stored in a data container that is separate from the plurality of electronically stored documents, and wherein propagating the review content comprises linking the review content to the one or more of the plurality of related documents in the group.

6. The method of claim 1, further comprising:
  producing a first plurality of documents from the plurality of electronically stored documents in response to a query related to the review content associated with the group, the first plurality of documents including at least one document from the related documents in the document group.

7. The method of claim 6, further comprising:
storing an original source location and a custodian for each of the first plurality of documents.

8. The method of claim 1, wherein associating the review content with the group comprises associating the review content with a pivot document in the group.

9. The method of claim 1, wherein the review content comprises each addition and each modification of the review content.

10. A system comprising:
a processor; and
a memory to store processor-executable instructions that cause the processor to:
combine a plurality of electronically stored documents into a plurality of groups, wherein each group comprises a plurality of related documents, and wherein for each of the plurality of electronically stored documents the combining comprises:
comparing a feature vector of the electronically stored document to a set of potential categories, wherein the feature vector comprises one or more feature vector words of the electronically stored document,
determining a subset of the potential categories based on a relevance score between the electronically stored document and a first category within the subset of the potential categories exceeds a first threshold, and
assigning the electronically stored document to a second category within the subset of the potential categories based on a similarity distance between the feature vector of the electronically stored document and a feature vector of the second category exceeds a second threshold;
receive review content provided by a user for a group of the plurality of groups;
associate the review content with the group; and
propagate the review content based on propagation information indicating documents in the group to which to propagate the review content based on a review of at least one of the related documents, wherein propagating the review content based on the propagation information comprises at least one of propagating the review content to each of the plurality of related documents or propagating the review content to a subset of the plurality of related documents, wherein the review content comprises redaction information to redact a portion of each of the plurality of related documents or to redact a portion of each document of the subset of the plurality of related documents, and wherein the redaction information specifies one or more locations corresponding to line numbers of each of the plurality of related documents or each document of the subset of the plurality of related documents that are not displayed in response to a query returning the documents.

11. The system of claim 10, wherein the review content is indicative of textual information or an annotation.

12. The system of claim 10, wherein the processor is further to:
receive another review content for the group; and
generate a final version of each related document in the plurality of related documents in the group, wherein the final version includes the review content and the additional review content.

13. The system of claim 10, wherein the review content comprises each addition and each modification of the review content.

14. A non-transitory computer readable storage medium including instructions that, when executed by a processor, cause the processor to perform operations comprising:
combining a plurality of electronically stored documents into a plurality of groups, wherein each group comprises a plurality of related documents, and wherein for each of the plurality of electronically stored documents the combining comprises:
comparing a feature vector of the electronically stored document to a set of potential categories, wherein the feature vector comprises one or more feature vector words of the electronically stored document,
determining a subset of the potential categories based on a relevance score between the electronically stored document and a first category within the subset of the potential categories exceeds a first threshold, and
assigning the electronically stored document to a second category within the subset of the potential categories based on a similarity distance between the feature vector of the electronically stored document and a feature vector of the second category exceeds a second threshold;
receiving review content provided by a user for a group of the plurality of groups;
associating the review content with the group; and
propagating the review content based on propagation information indicating documents in the group to which to propagate the review content based on a review of at least one of the related documents, wherein propagating the review content based on the propagation information comprises at least one of propagating the review content to each of the plurality of related documents or propagating the review content to a subset of the plurality of related documents, wherein the review content comprises redaction information to redact a portion of each of the plurality of related documents or to redact a portion of each document of the subset of the plurality of related documents, and wherein the redaction information specifies one or more locations corresponding to line numbers of each of the plurality of related documents or each document of the subset of the plurality of related documents that are not displayed in response to a query returning the documents.

15. The non-transitory computer readable storage medium of claim 14, wherein the review content is indicative of textual information or an annotation.

16. The non-transitory computer readable storage medium of claim 14, wherein the process is further to:
receive another review content for the group; and
generate a final version of each related document in the plurality of related documents in the group, wherein the final version includes the review content and the additional review content.

17. The non-transitory computer readable storage medium of claim 14, wherein the processor is further to:
produce a first plurality of documents from the plurality of electronically stored documents in response to a query related to the review content associated with the group, the first plurality of documents including at least one document from the related documents in the document group.

18. The non-transitory computer readable storage medium of claim 14, wherein the processor is further to:
store an original source location and a custodian for each of the first plurality of documents.

19. The non-transitory computer readable storage medium of claim 14, wherein the review content comprises each addition and each modification of the review content.

* * * * *